US011379688B2

United States Patent
Di Febbo et al.

(10) Patent No.: US 11,379,688 B2
(45) Date of Patent: Jul. 5, 2022

(54) SYSTEMS AND METHODS FOR KEYPOINT DETECTION WITH CONVOLUTIONAL NEURAL NETWORKS

(71) Applicant: PACKSIZE LLC, Salt Lake City, UT (US)

(72) Inventors: Paolo Di Febbo, Mountain View, CA (US); Carlo Dal Mutto, Sunnyvale, CA (US); Kinh Tieu, Sunnyvale, CA (US)

(73) Assignee: PACKSIZE LLC, Salt Lake City, UT (US)

( * ) Notice: Subject to any disclaimer, the term of this patent is extended or adjusted under 35 U.S.C. 154(b) by 285 days.

(21) Appl. No.: 15/924,162

(22) Filed: Mar. 16, 2018

(65) Prior Publication Data

US 2018/0268256 A1    Sep. 20, 2018

Related U.S. Application Data

(60) Provisional application No. 62/520,353, filed on Jun. 15, 2017, provisional application No. 62/472,543, filed on Mar. 16, 2017.

(51) Int. Cl.
*G06K 9/62* (2022.01)
*G06N 3/08* (2006.01)
(Continued)

(52) U.S. Cl.
CPC ......... *G06K 9/6256* (2013.01); *G06K 9/6273* (2013.01); *G06N 3/0454* (2013.01);
(Continued)

(58) Field of Classification Search
CPC .. G06K 9/6256; G06K 9/6273; G06K 9/6211; G06K 9/4628; G06K 9/4671;
(Continued)

(56) References Cited

U.S. PATENT DOCUMENTS 9,674,504 B1    6/2017  Salvagnini et al.
10,019,788 B1 *  7/2018  Kish ............... G06K 9/00369
(Continued)

OTHER PUBLICATIONS

Qiu, Jiantao, et al. "Going deeper with embedded fpga platform for convolutional neural network." Proceedings of the 2016 ACM/SIGDA International Symposium on Field-Programmable Gate Arrays. 2016. (Year: 2016).*

(Continued)

*Primary Examiner* — Sean M Conner
*Assistant Examiner* — Han Hoang

(57) ABSTRACT

A keypoint detection system includes: a camera system including at least one camera; and a processor and memory, the processor and memory being configured to: receive an image captured by the camera system; compute a plurality of keypoints in the image using a convolutional neural network including: a first layer implementing a first convolutional kernel; a second layer implementing a second convolutional kernel; an output layer; and a plurality of connections between the first layer and the second layer and between the second layer and the output layer, each of the connections having a corresponding weight stored in the memory; and output the plurality of keypoints of the image computed by the convolutional neural network.

30 Claims, 17 Drawing Sheets
(3 of 17 Drawing Sheet(s) Filed in Color)

(51) Int. Cl.
| | |
|---|---|
| *G06T 7/00* | (2017.01) |
| *G06T 7/246* | (2017.01) |
| *G06N 3/04* | (2006.01) |
| *G06V 10/44* | (2022.01) |
| *G06V 10/46* | (2022.01) |
| *G06V 10/75* | (2022.01) |
| *H04N 5/33* | (2006.01) |
| *G06N 3/063* | (2006.01) |

(52) U.S. Cl.
CPC ............. *G06N 3/084* (2013.01); *G06T 7/001* (2013.01); *G06T 7/246* (2017.01); *G06V 10/44* (2022.01); *G06V 10/454* (2022.01); *G06V 10/462* (2022.01); *G06V 10/757* (2022.01); *G06N 3/063* (2013.01); *G06T 2207/10016* (2013.01); *G06T 2207/10024* (2013.01); *G06T 2207/10028* (2013.01); *G06T 2207/10048* (2013.01); *G06T 2207/20081* (2013.01); *G06T 2207/20084* (2013.01); *H04N 5/33* (2013.01)

(58) Field of Classification Search
CPC .... G06K 9/4604; G06N 3/0454; G06N 3/063; G06N 3/084; G06T 7/246; G06T 2207/10048; G06T 2207/10028; G06T 2207/10016; G06T 2207/20081; G06T 2207/10024; G06T 2207/20084; G06T 7/001; H04N 5/33
See application file for complete search history.

(56) References Cited

U.S. PATENT DOCUMENTS

| | | |
|---|---|---|
| 2011/0196661 A1 | 8/2011 | Spicola et al. |
| 2011/0267344 A1 | 11/2011 | Germann et al. |
| 2013/0286012 A1 | 10/2013 | Medioni et al. |
| 2014/0253546 A1 | 9/2014 | Hickman et al. |
| 2015/0261184 A1 | 9/2015 | Mannion et al. |
| 2016/0071318 A1 | 3/2016 | Lee et al. |
| 2016/0189426 A1 | 6/2016 | Thomas et al. |
| 2016/0189433 A1 | 6/2016 | Dayde et al. |
| 2018/0096224 A1* | 4/2018 | Fua .................... G06K 9/00523 |
| 2018/0096226 A1* | 4/2018 | Aliabadi ................. G06N 3/10 |

OTHER PUBLICATIONS

Wenzel, Konrad, et al. "A multi-camera system for efficient point cloud recording in close range applications." LC3D workshop, Berlin. 2011. (Year: 2011).*
A. Richardson and E. Olson. Learning convolutional filters for interest point detection. In *2013 IEEE International Conference on Robotics and Automation*, pp. 631-637, May 2013.
A. Sironi, B. Tekin, R. Rigamonti, V. Lepetit, and P. Fua. Learning separable filters. *IEEE Transactions on Pattern Analysis and Machine Intelligence*, 37(1):94-106, Jan. 2015.
Besl, P. J., & McKay, N. D. (Apr. 1992). Method for registration of 3-D shapes. In Robotics—DL tentative (pp. 586-606). International Society for Optics and Photonics.
Bradski, G., & Kaehler, A. (2008). Learning OpenCV: Computer vision with the OpenCV library. "O'Reilly Media, Inc.".
Bradski, G., & Kaehler, A. (2008). Learning OpenCV: Computer vision with the OpenCV library. "O'Reilly Media, Inc."., 571 pages.
Bradski, G., Dr. Dobb's The World of Software Development, OpenCV Library, www.drdobbs.com/open -source/the-opencv-library/184404319?pno=1, 2000, 7 pages.
C. Strecha, A. Lindner, K. Ali, and P. Fua. Training for task specific keypoint detection. In *Pattern Recognition, 31st DAGM Symposium*, Jena, Germany, Sep. 9-11, 2009. *Proceedings*, pp. 151-160, 2009.
D. G. Lowe. Distinctive image features from scale-invariant keypoints. *Int. J. Comput. Vision*, 60(2):91-110, Nov. 2004.
E. Rosten and T. Drummond. Machine learning for high-speed corner detection. In *Proceedings of the 9th European Conference on Computer Vision*—vol. Part I, ECCV'06, pp. 430-443, Berlin, Heidelberg, 2006. Springer-Verlag.
E. Rublee, V. Rabaud, K. Konolige, and G. Bradski. Orb: An efficient alternative to sift or surf. In *Proceedings of the 2011 International Conference on Computer Vision*, ICCV '11, pp. 2564-2571, Washington, DC, USA, 2011. IEEE Computer Society.
Fischler, M. A., & Bolles, R. C. (1981). Random sample consensus: a paradigm for model fitting with applications to image analysis and automated cartography. Communications of the ACM, 24(6), 381-395.
H. Bay, A. Ess, T. Tuytelaars, and L. V. Gool. Speeded-up robust features (surf). *Computer Vision and Image Understanding*, 110(3):346-359, 2008. Similarity Matching in Computer Vision and Multimedia.
J. Matas, O. Chum, M. Urban, and T. Pajdla. Robust wide baseline stereo from maximally stable extremal regions. In *Proceedings of the British Machine Vision Conference*, pp. 36.1-36.10. BMVA Press, 2002.
J. Šochman and J. Matas. Learning fast emulators of binary decision processes. *International Journal of Computer Vision*, 83(2):149-163, 2009.
K. M. Yi, E. Trulls, V. Lepetit, and P. Fua. LIFT: Learned Invariant Feature Transform. In *Proceedings of the European Conference on Computer Vision*, 2016.
K. Mikolajczyk and C. Schmid. An affine invariant interest point detector. In *Proceedings of the 7th European Conference on Computer Vision—Part I*, ECCV '02, pp. 128-142, London, UK, UK, 2002. Springer-Verlag.
K. Wilson and N. Snavely. Robust global translations with 1dsfm. In *Proceedings of the European Conference on Computer Vision (ECCV)*, 2014.
Krizhevsky, A., Sutskever, I., & Hinton, G. E. (2012). Imagenet classification with deep convolutional neural networks. In Advances in neural information processing systems (pp. 1097-1105).
L. Trujillo and G. Olague. Using evolution to learn how to perform interest point detection. In *18th International Conference on Pattern Recognition (ICPR'06)*, vol. 1, pp. 211-214, 2006.
LaValle, S. M., Yershova, A., Katsev, M., & Antonov, M. (May 2014). Head tracking for the Oculus Rift. In Robotics and Automation (ICRA), 2014 IEEE International Conference on (pp. 187-194). IEEE.
P. Dollar, Z. Tu, and S. Belongie. Supervised learning of edges and object boundaries. In *Proceedings of the 2006 Conference on Computer Vision and Pattern Recognition*—vol. 2, CVPR '06, pp. 1964-1971, Washington, DC, USA, 2006. IEEE Computer Society.
P. F. Alcantarilla, A. Bartoli, and A. J. Davison. Kaze features. In *Proceedings of the 12th European Conference on Computer Vision—*vol. Part VI, ECCV'12, pp. 214-227, Berlin, Heidelberg, 2012. Springer-Verlag.
P. Mainali, G. Lafruit, K. Tack, L. V. Gool, and R. Lauwereins. Derivative-based scale invariant image feature detector with error resilience. *IEEE Transactions on Image Processing*, 23(5):2380-2391, May 2014.
P. Mainali, G. Lafruit, Q. Yang, B. Geelen, L. V. Gool, and R. Lauwereins. Sifer: Scale-invariant feature detector with error resilience. *Int. J. Comput. Vision*, 104(2):172-197, Sep. 2013.
R. H. R. Hahnloser, R. Sarpeshkar, M. A. Mahowald, R. J. Douglas, and H. S. Seung. Digital selection and analogue amplification coexist in a cortex-inspired silicon circuit. Nature, 405(6789):947-951, Jun. 2000.
Ragnemalm, I. (1993). The Euclidean distance transform in arbitrary dimensions. Pattern Recognition Letters, 14(11), 883-888.
S. Gupta, A. Agrawal, K. Gopalakrishnan, and P. Narayanan. Deep learning with limited numerical precision. In *Proceedings of the 32nd International Conference on Machine Learning (ICML-15)*, pp. 1737-1746. JMLR Workshop and Conference Proceedings, 2015.
T. Lindeberg. Image matching using generalized scale-space interest points. *Journal of Mathematical Imaging and Vision*, 52(1):3-36, 2015.

(56) References Cited

OTHER PUBLICATIONS

U.S. Appl. No. 15/805,107, filed Nov. 6, 2017, entitled "System and Method for Portable Active 3D Scanning".
U.S. Appl. No. 15/866,217, filed Jan. 9, 2018, entitled "Systems and Methods for Defect Detection".
W. Hartmann, M. Havlena, and K. Schindler. Predicting matchability. In *2014 IEEE Conference on Computer Vision and Pattern Recognition*, pp. 9-16, Jun. 2014.
Y. Verdie, K. M. Yi, P. Fua, and V. Lepetit. TILDE: A Temporally Invariant Learned DEtector. In *Proceedings of the Computer Vision and Pattern Recognition*, 2015.
You, S., & Neumann, U. (Mar. 2001). Fusion of vision and gyro tracking for robust augmented reality registration. In Virtual Reality, 2001. Proceedings. IEEE (pp. 71-78). IEEE.
Besl et al., "A Method for Registration of 3-D Shapes," IEEE Transactions on Pattern Analysis and Machine Intelligence, vol. 14, No. 2, Feb. 1992 (pp. 239-256).
Szeliski, Richard. Computer vision: algorithms and applications. Springer Science & Business Media, 2010, pp. 181-210.
Yang, Jiaolong, Hongdong Li, and Yunde Jia. "Go-icp: Solving 3d registration efficiently and globally optimally." Proceedings of the IEEE International Conference on Computer Vision. 2013, pp. 1457-1464.

\* cited by examiner

SYSTEMS AND METHODS FOR KEYPOINT DETECTION WITH CONVOLUTIONAL NEURAL NETWORKS

CROSS-REFERENCE TO RELATED APPLICATION(S)

This application claims the benefit of U.S. Provisional Patent Application No. 62/472,543, "SYSTEMS AND METHODS FOR IMPLEMENTING KEYPOINT DETECTION AS CONVOLUTIONAL NEURAL NETWORKS," filed in the United States Patent and Trademark Office on Mar. 16, 2017 and U.S. Provisional Patent Application No. 62/520,353, "ENABLING HIGH SPEED 3D TRACKING WITH FAST KEYPOINTS DETECTION," filed in the United States Patent and Trademark Office on Jun. 15, 2017, the entire disclosures of which are incorporated by reference herein.

BACKGROUND

In the field of computer vision, the term "keypoint" refers to a point in an image that has specific properties, which may be application-dependent. For example, keypoints may be defined as points that are well-localizable in the face of image noise: if the same image is seen with a different amount of noise, the location of a keypoint should not change. Keypoints may also be defined in terms of repeatability: if an image of the same scene is taken from the same viewpoint at different points in time, possibly with different illumination characteristics, the same keypoint should be recognizable across all such images. Other useful characteristics of keypoints can be defined in terms of geometric invariance (i.e., the ability to recognize the projection of the same surface point in different images taken from different viewpoints), or distinctiveness (i.e., the unique characters of the local image appearance in the neighborhood of a keypoint).

FIG. 1 is a schematic illustration of a good keypoint and worse keypoints in an image. FIG. 1 shows two different images 102 and 104 of a scene containing a box. The appearance of the pixels within patches of the image, as indicated by the dashed line squares 112 and 114, can be localized (e.g., centered at the corner where the three edges meet), and those pixels are unique in the two images (e.g., the is only one place in each of the two images where three lines meet at those angles). Accordingly, the dashed line squares correspond to "good" keypoints in the images 102 and 104.

On the other hand, other patches, as indicated by the dotted line squares 122, 124, and 134, are do not correspond to good keypoints. For example, it is ambiguous as to whether the patch 122 from the left image 102 matches with a patch 124 from the upper portion of the edge of the box, a patch 134 from the lower portion of the edge of the box, or perhaps any other patch along that line.

Keypoint detection and matching across images is a preliminary step in a number of different computer vision tasks such as object tracking, structure from motion, and 3-D reconstruction. For example, keypoints can be used to detect stable features of an object and to track the movement of the object from one image to the next (e.g., across different frames of video). This may also allow, for example, a camera system to pan or zoom to keep the object within its field of view. As another example, structure from motion involves the calculation of a three-dimensional (3-D) shape of an object by matching the locations of the keypoints of the object in different images as the object or the camera moves.

Different computer vision tasks and different types of images typically involve the manual development and tuning of a keypoint detector to suit particular applications. Accordingly, different keypoint detection algorithms detect keypoints based on different criteria and different desired behavior to suit the computer vision task. Examples of comparative keypoint detectors include the Scale Invariant Feature Transform (SIFT) (see, e.g., Lowe, David G. "Distinctive image features from scale-invariant keypoints." *International journal of computer vision* 60.2 (2004): 91-110.) and KAZE features (see, e.g., Alcantarilla, Pablo Fernández, Adrien Bartoli, and Andrew J. Davison. "KAZE features." *European Conference on Computer Vision*. Springer, Berlin, Heidelberg, 2012.). These comparative keypoint detectors are based on combinations of derivative operations, such as difference of Gaussians in the case of SIFT, and the determinant of the Hessian with nonlinear diffusion in the case of KAZE, and are typically implemented using standard image processing techniques.

These comparative keypoint detectors are typically manually tuned to detect the particular types of features that the users expect encounter in the particular application domain in which they are deployed. For example, these keypoint detectors may be developed based on handcrafted combinations of derivative operations. This manual tuning or handcrafting of the parameters is typically time consuming. Furthermore, because comparative keypoint detectors are typically implemented using standard image processing techniques, are typically computationally expensive (e.g., may involve high power consumption and high speed processors).

SUMMARY

Aspects of embodiments of the present invention relate to systems and methods for implementing keypoint detection using convolutional neural networks. A neural network according to embodiments of the present invention can be trained to predict the output of a comparative keypoint detector (or a combination of such keypoint detectors), and can be implemented using application specific hardware (e.g., a configured field programmable gate array, an application specific integrated circuit, or the like), and may therefore also result in reduced power consumption and reduced processing time in comparison to comparative keypoint detectors implemented using standard image processing techniques, thereby enabling real-time operation at a high frame rate (e.g., 60 frames per second) with a power consumption level appropriate for a mobile or handheld device and/or battery powered operation.

According to one embodiment of the present invention, a system includes: a camera system including at least one camera; and a processor and memory, the processor and memory being configured to: receive an image captured by the camera system; compute a plurality of keypoints in the image using a convolutional neural network including: a first layer implementing a first convolutional kernel; a second layer implementing a second convolutional kernel; an output layer; and a plurality of connections between the first layer and the second layer and between the second layer and the output layer, each of the connections having a corresponding weight stored in the memory; and output the plurality of keypoints of the image computed by the convolutional neural network.

The weights may be computed by a training system including a processor and memory, the memory of the training system may have instructions stored thereon that, when executed by the processor of the training system, cause the training system to: generate training data including a plurality of training images and training detected keypoints of the training images; and train the convolutional neural network using the training images and the training detected keypoints of the training data.

The training detected keypoints may include manually generated training detected keypoints.

The training detected keypoints may include keypoints generated by supplying the training images to one or more keypoint detection algorithms.

The one or more keypoint detection algorithms may include KAZE.

The one or more keypoint detection algorithms may include SIFT.

The training data may be computed using at least two different keypoint detection algorithms.

The training detected keypoints may further include manually generated training detected keypoints.

The memory of the training system may further have instructions stored thereon that, when executed by the processor of the training system, cause the training system to train the convolutional neural network by: transforming the training detected keypoints to a Gaussian response space; uniformly sampling patches from the response space; identifying patches of the training images corresponding to the sampled patches to generate a first training set for training the convolutional neural network; and computing a plurality of first stage learned neural network parameters from the first training set using backpropagation.

The memory of the training system may further have instructions stored thereon that, when executed by the processor of the training system, cause the training system to train the convolutional neural network further by: configuring the convolutional neural network using the first stage learned neural network parameters; computing inferred responses of the convolutional neural network, configured with the first stage learned neural network parameters, to a plurality of training images; adding, to the first training set, patches from the training images where a difference between the inferred response and the response space exceeds a threshold to generate a second training set; adding, to the second training set, additional patches randomly sampled from the training images; and computing a plurality of second stage learned neural network parameters from the second training set using backpropagation.

The memory of the training system may further have instructions stored thereon that, when executed by the processor of the training system, cause the training system to train the convolutional neural network further b repeatedly updating the second stage learned neural network parameters until a convergence state of the second stage learned neural network parameters, the updating the second stage learned neural network parameters including: configuring the convolutional neural network using the second stage learned neural network parameters; computing updated inferred responses of the convolutional neural network, configured with the second stage learned neural network parameters, to the plurality of training images; adding, to the second training set, patches from the training images where a difference between the updated inferred response and the response space exceeds the threshold; adding, to the second training set, additional patches randomly sampled from the training images; and re-computing the plurality of second stage learned neural network parameters from the second training set using backpropagation.

The first convolutional kernel may be separable.

The camera system may include: a first infrared camera having a first optical axis and a field of view; a second infrared camera having a second optical axis substantially parallel to the first optical axis and a field of view substantially overlapping the field of view of the first infrared camera; and an infrared illuminator configured to project light in a direction within the field of view of the first infrared camera and the field of view of the second infrared camera, wherein the image may be a point cloud computed from infrared images captured by the first infrared camera and the second infrared camera.

The camera system may be arranged to place a conveyor belt in the field of view of the first infrared camera and the field of view of the second infrared camera, wherein the processor may be configured to: control the camera system to capture images of objects on the conveyor belt; compute a plurality of point clouds from the images of the objects; identify keypoints of the point clouds using the convolutional neural network; and merge two or more of the point clouds by identifying corresponding ones of the keypoints and rigidly transforming at least one of the point clouds to align the corresponding ones of the keypoints.

The processor may be further configured to compute a volume of an object in accordance with one or more captured point clouds of the object.

The camera system and the processor and memory may be integrated in a handheld device, and the processor may be configured to: control the camera system to capture images of a scene; compute a plurality of point clouds from the images of the scene; identify keypoints of the point clouds using the convolutional neural network; merge two or more of the point clouds by identifying corresponding ones of the keypoints; generate a 3-D model of an object in the scene; perform defect detection on the 3-D model of the object; and display portions of the 3-D model that are defective on a display device of the handheld device.

The processor may include a field programmable gate array, and the field programmable gate array may be configured by the weights to implement the convolutional neural network.

The processor may include an application specific integrated circuit, and the application specific integrated circuit may be configured by the weights to implement the convolutional neural network.

The application specific integrated circuit may include a tensor processing unit.

The processor may include a graphics processing unit, and the graphics processing unit may be configured by the weights to implement the convolutional neural network.

The processor may include a system on chip, the system on chip including the graphics processing unit as an integrated component.

The weights may have values quantized as fixed points.

According to one embodiment of the present invention, a method for computing keypoints of an image includes: controlling, by a processor, a camera system including at least one camera to capture an image; supplying, by the processor, the image to a convolutional neural network to compute a plurality of keypoints, the convolutional neural network including: a first layer implementing a first convolutional kernel; a second layer implementing a second convolutional kernel; an output layer; and a plurality of connections between the first layer and the second layer and between the second layer and the output layer, each of the connections having a corresponding weight stored in a memory; and outputting the plurality of keypoints of the image computed by the convolutional neural network.

The weights may be computed by: generating training data including a plurality of training images and training detected keypoints of the training images; and training the convolutional neural network using the training images and the training detected keypoints of the training data.

The training detected keypoints may include manually generated training detected keypoints.

The training detected keypoints may include keypoints generated by supplying the training images to one or more keypoint detection algorithms.

The one or more keypoint detection algorithms may include KAZE.

The one or more keypoint detection algorithms may include SIFT.

The training data may be computed using at least two different keypoint detection algorithms.

The training detected keypoints may further include manually generated training detected keypoints.

The training the convolutional neural network may include: transforming the training detected keypoints to a Gaussian response space; uniformly sampling patches from the response space; identifying patches of the training images corresponding to the sampled patches to generate a first training set for training the convolutional neural network; and computing a plurality of first stage learned neural network parameters from the first training set using backpropagation.

The training the convolutional neural network may further include: configuring the convolutional neural network using the first stage learned neural network parameters; computing inferred responses of the convolutional neural network, configured with the first stage learned neural network parameters, to a plurality of training images; adding, to the first training set, patches from the training images where a difference between the inferred response and the response space exceeds a threshold to generate a second training set; adding, to the second training set, additional patches randomly sampled from the training images; and computing a plurality of second stage learned neural network parameters from the second training set using backpropagation.

The training the convolutional neural network may further include repeatedly updating the second stage learned neural network parameters until a convergence state of the second stage learned neural network parameters, the updating the second stage learned neural network parameters including: configuring the convolutional neural network using the second stage learned neural network parameters; computing updated inferred responses of the convolutional neural network, configured with the second stage learned neural network parameters, to the plurality of training images; adding, to the second training set, patches from the training images where a difference between the updated inferred response and the response space exceeds the threshold; adding, to the second training set, additional patches randomly sampled from the training images; and re-computing the plurality of second stage learned neural network parameters from the second training set using backpropagation.

The first convolutional kernel may be separable.

The image may be a point cloud computed infrared images captured by a camera system including: a first infrared camera having a first optical axis and a field of view; a second infrared camera having a second optical axis and field of view, the first optical axis being substantially parallel to the second optical axis, and the field of view of the first infrared camera substantially overlapping the field of view of the second infrared camera; and an infrared illuminator configured to project light in a direction within the field of view of the first infrared camera and the field of view of the second infrared camera.

The method may further include: controlling the camera system to capture images of objects on a conveyor belt; computing a plurality of point clouds from the images of the objects; identifying keypoints of the point clouds using the convolutional neural network; and merging two or more of the point clouds by identifying corresponding ones of the keypoints.

The method may further include computing a volume of an object in accordance with one or more captured point clouds of the object.

The camera system and the processor may be integrated in a handheld device, and the method may further include: controlling the camera system to capture images of a scene; computing a plurality of point clouds from the images of the scene; identifying keypoints of the point clouds using the convolutional neural network; merging two or more of the point clouds by identifying corresponding ones of the keypoints; generating a 3-D model of an object in the scene; performing defect detection on the 3-D model of the object; and displaying portions of the 3-D model that are defective on a display device of the handheld device.

The processor may include a field programmable gate array, and the field programmable gate array may be configured by the weights to implement the convolutional neural network.

The processor may include an application specific integrated circuit, and the application specific integrated circuit may be configured by the weights to implement the convolutional neural network.

The application specific integrated circuit may include a tensor processing unit.

The processor may include a graphics processing unit, and the graphics processing unit may be configured by the weights to implement the convolutional neural network.

The processor may include a system on chip, the system on chip including the graphics processing unit as an integrated component.

The weights may have values quantized as fixed points.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIGS. 11A and 11B depict to the repeatability rate of the keypoint detectors in the face of increasing levels of blur applied to two different sets of sample images ("bikes" and "trees," respectively), where the horizontal axis relates to the amount of blur and the vertical axis relates to repeatability rate (higher values of repeatability rate are better).

FIG. 11C depicts the repeatability rate of the keypoint detectors with increasing viewpoint angle (e.g., increasing angle between two images used for evaluating the repeatability rate).

FIG. 11D depicts the repeatability rate of the keypoint detectors in the face of increasing levels of Joint Photographic Experts Group (JPEG) compression.

DETAILED DESCRIPTION

Figure 1:
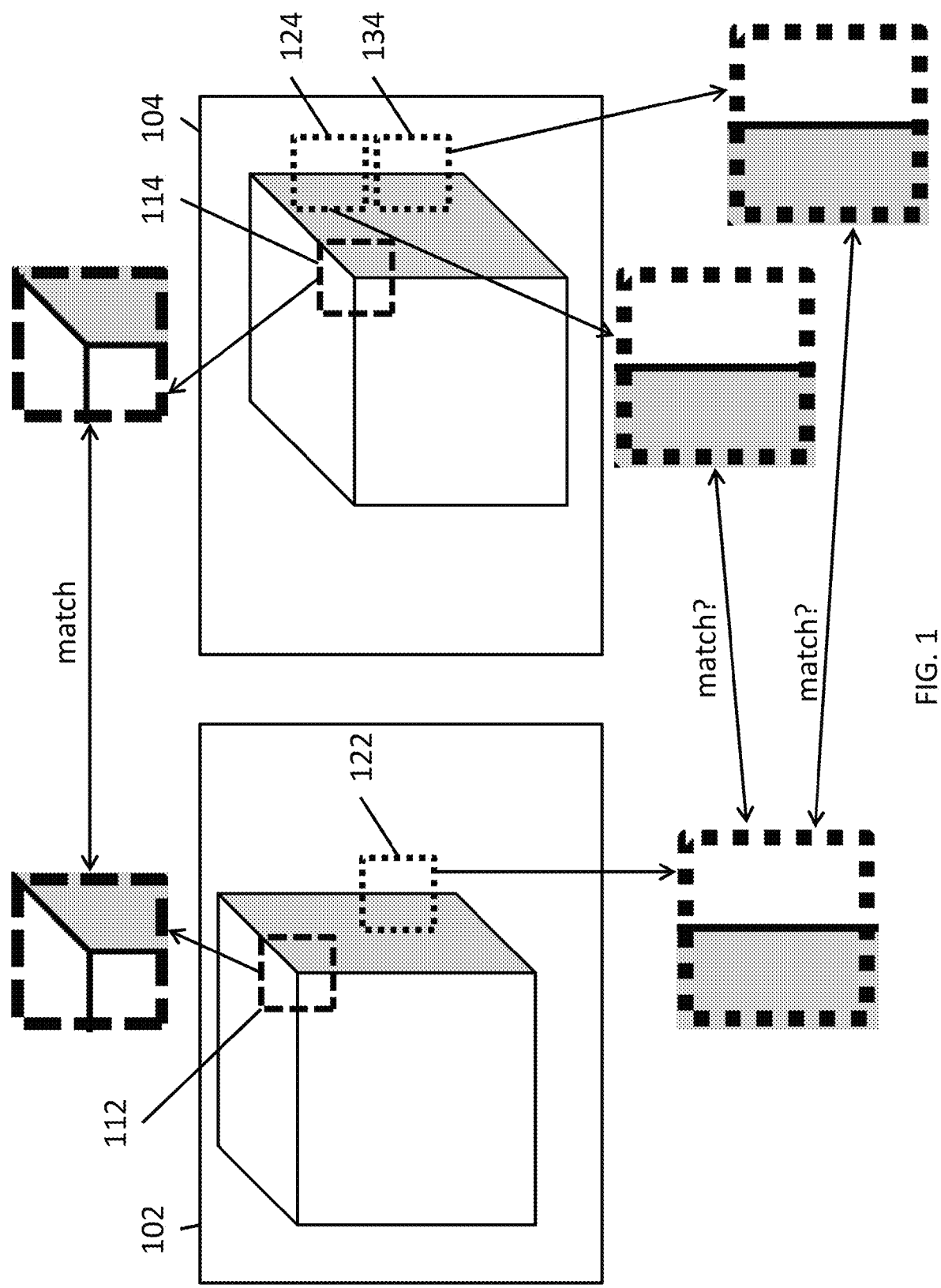
FIG. 1 is a schematic illustration of a good keypoint and worse keypoints in an image.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Figure 2:
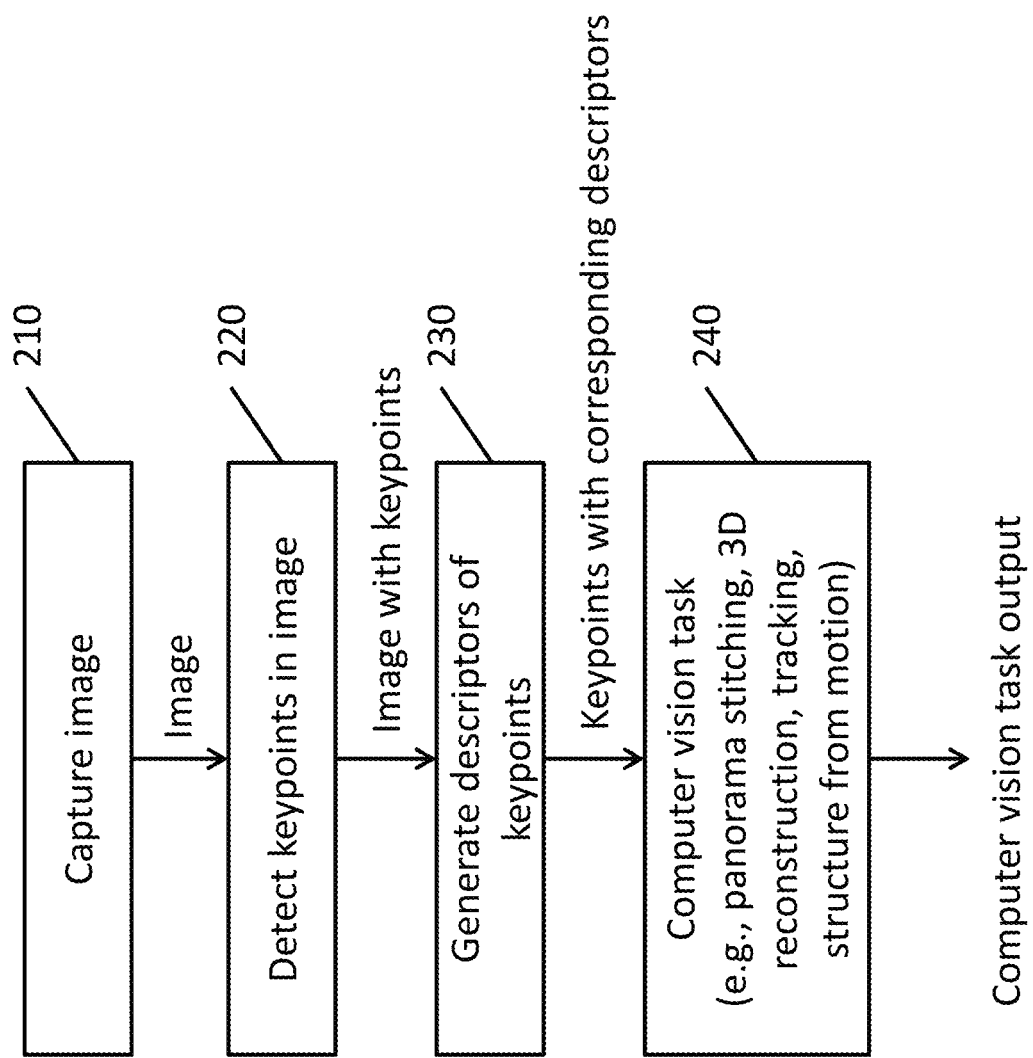
FIG. 2 is a flowchart of a processing pipeline in an example of a computer vision system according to one embodiment of the present invention.

Aspects of embodiments of the present invention are directed to systems and methods for keypoint detection using a convolutional neural network (CNN), to detect keypoints for use in another computer vision task in as shown in FIG. 2, described in more detail below. In some embodiments, the CNN has a compact three-layer architecture with separable convolutional kernels. Some aspects of embodiments of the present invention relate to a method for training the CNN in order to learn values of the network parameters that allow for an approximation of the behavior of handcrafted keypoint detectors. Empirical results on standard datasets are used to validate the proposed approach and show that the proposed architecture is able to obtain results comparable with the state of the art at more quickly and with lower power consumption.

Keypoint Detection

Keypoint detection is an early stage operation in a variety of processing pipelines for performing computer vision tasks. FIG. 2 is a flowchart of a processing pipeline in an example of a computer vision system, although embodiments of the present invention are not limited thereto. Referring to FIG. 2, a computer vision system may initially capture an image 210 and detect keypoints within the image 220. As discussed above, the keypoints are generally portions (e.g., patches) of the image that are, for example, well-localizable and repeatable and that demonstrate geometric invariance and distinctiveness. Generally, a computer vision system also generates descriptors of the keypoints 230, where each descriptor includes information about the patches of the keypoint (e.g., color information about the pixels in the patch of the keypoint) to allow the keypoints to be uniquely identified in each image. The keypoints may then be supplied to a computer vision task 240 such as panorama stitching, three-dimensional (3-D) reconstruction, tracking, and structure from motion in order to generate a computer vision task output such as a stitched panorama, a 3-D model, a position and orientation of a tracked object, and the like.

The notion of a "keypoint" is not uniquely defined. Different keypoint detection algorithms differ in terms of performance and computational cost. A standard measure of quality of a keypoint detection algorithm is its repeatability, which is the ability to detect the same keypoint in two different images taken from different viewpoints. One measure of repeatability is based on image data sets that contain warped versions of each image in the set (where the warping may be induced by a known perspective transformation). When repeatability is low, the proportion of keypoints detected in two consecutive images of the same scene is also low, which complicates the job of subsequent modules that rely on keypoint matching across images (e.g., structure from motion) Examples of keypoint detectors that have good repeatability include the aforementioned Scale Invariant Feature Transform (SIFT) and KAZE as well as Speeded Up Robust Features (SURF) (see, e.g., Bay, H., Tuytelaars, T., & Van Gool, L. (2006). SURF: Speeded up robust features. Computer vision-ECCV 2006, 404-417.).

Other keypoint detectors include: maximally stable extremal regions (MSER) (see J. Matas, O. Chum, M. Urban, and T. Pajdla. Robust wide baseline stereo from maximally stable extremal regions. In *Proceedings of the British Machine Vision Conference*, pages 36.1-36.10.

BMVA Press, 2002.); an affine invariant detector (see K. Mikolajczyk and C. Schmid. An affine invariant interest point detector. In *Proceedings of the 7th European Conference on Computer Vision-Part I, ECCV '02*, pages 128-142, London, UK, UK, 2002. Springer-Verlag.); scale invariant feature detector with error resilience (SIFER) (see P. Mainali, G. Lafruit, Q. Yang, B. Geelen, L. V. Gool, and R. Lauwereins. SIFER: Scale-invariant feature detector with error resilience. *Int. J. Comput. Vision*, 104(2):172-197, September 2013.); and derivative-based scale invariant feature detector with error resilience (D-SIFER) (see P. Mainali, G. Lafruit, K. Tack, L. V. Gool, and R. Lauwereins. Derivative-based scale invariant image feature detector with error resilience. *IEEE Transactions on Image Processing*, 23(5):2380-2391, May 2014.).

Generally, keypoint detectors that produce high repeatable keypoints are computationally intensive. For example, among the SIFT, KAZE (or Accelerated KAZE or AKAZE), and SURF keypoint detection algorithms, the KAZE algorithm has superior repeatability. Implemented in the well-known OpenCV library (see, e.g., Bradski, Gary. The OpenCV Library (2000). *Dr. Dobb's Journal of Software Tools* (2000) and Bradski, Gary, and Adrian Kaehler. *Learning OpenCV: Computer vision with the OpenCV library*. O'Reilly Media, Inc., 2008.), it takes an Intel® i7-5930K processor (having 6 cores, running at 3.5 GHz, with 140 W of power dissipation) about 58 milliseconds to process an image with size of 1280×800 pixels. The large latency introduced by the KAZE algorithm, even with computationally powerful hardware, makes it unsuitable for deployment in applications that require high frame rate. In addition, the high power consumption figure (e.g., 140 Watts) is not compatible with deployment on mobile devices, and the algorithm cannot effectively be implemented on slower mobile processors having smaller thermal design power (TDP) at the full frame rate of the camera.

Furthermore, as discussed above, different computer vision tasks may require different types of keypoints. Accordingly, aspects of embodiments of the present invention are directed to keypoint detection systems that are easily re-programmable to alter their keypoint detection behaviors appropriately for the computer vision task at hand. Another aspect of embodiments of the present invention relates to keypoint detection systems that are computationally efficient, such that they are fast enough to enable images to be processed at a high frame rate (e.g., 60 frames per second) with low latency. Still additional aspects of the present invention are directed to power efficient keypoint detectors that are suitable for use on battery-operated hardware, in order to improve battery life.

Accordingly, embodiments of the present invention may enable use of keypoint detectors, and consequently computer vision tasks relying on keypoint detectors, in power and compute constrained applications such as embedded systems (e.g., digital cameras, scanning devices, and other application-specific devices) and mobile devices (e.g., smartphones, tablets, and laptop computers). Generally, these considerations may also apply to handheld computing devices, where "handheld" may refer to devices that can be comfortably held in a user's hand for an extended period of operation, such as a smartphone, personal digital assistant (PDA), tablet computer, digital camera, and the like.

Convolutional Neural Network Keypoint Detectors

Aspects of embodiments of the present invention are directed to systems and methods for fast, power-efficient, reconfigurable keypoint detection. This system utilizes a general computational structure (a convolutional neural network) that can be "trained" to emulate the behavior of any given state-of-the-art keypoint detection algorithm, with substantially higher speed (e.g., reduced computation time and reduced latency) and reduced power consumption in comparison to using conventional image processing techniques such as algorithms implemented on a general purpose processor. This structure is controlled by a number of parameters (e.g., connection weights) that are learned from a set of labeled training images. As such, a keypoint detector using a convolutional neural network in accordance with embodiments of the present invention can be configured (or reconfigured) to detect keypoints in a way that is most appropriate for the task at hand by supplying these parameters. In some embodiment of the present invention, a keypoint detector is implemented in a Field Programmable Gate Array (FPGA) device. In other embodiments of the present invention, the keypoint detector is implemented in an Application-Specific Integrated Circuit (ASIC) or System-on-Chip (SoC). The keypoints detected by the keypoint detector may be supplied to a general purpose processor (or CPU), which can then perform other computer vision tasks using the keypoints, such as generating descriptors for the keypoints.

Examples of computer vision tasks that may use keypoint detection include point cloud merging for capturing three-dimensional (3-D) models of objects, computing 3-D structure from motion (SfM), and object tracking (e.g., tracking the location and orientation of a user's head in an augmented reality (AR) or virtual reality (VR) system). Examples of applications will be described in more detail below.

The implementation of keypoint detectors as CNNs leads to practical benefits. In particular, a design of this kind enables the inclusion of keypoint detection within a more complex system that may be based on CNNs as well (e.g., a CNN as early portion of a deep neural network), thereby allowing for end-to-end system training (see, e.g., K. M. Yi, E. Trulls, V. Lepetit, and P. Fua. LIFT: Learned Invariant Feature Transform. In *Proceedings of the European Conference on Computer Vision*, 2016.). Another advantage of CNN implementation with respect to handcrafted algorithms is that CNN implementations can take advantage of hardware advancements in both speed and power consumption. In particular, CNNs are often implemented on, for example, general purpose graphics processing units (GPGPUs), which currently benefit from regular improvements in speed and/or power-efficiency, as well as on advanced hardware solutions that have been developed for vector computing performance (e.g., Google® Tensor Processing Units or TPUs) and power-efficiency (e.g., Movidius® Fathom) and they can be implemented on custom high-efficiency and high-performance FPGA or silicon-based architectures. Therefore, implementing a keypoint detector using a CNN gains the benefits of independent hardware developments for executing neural networks.

Figure 3:
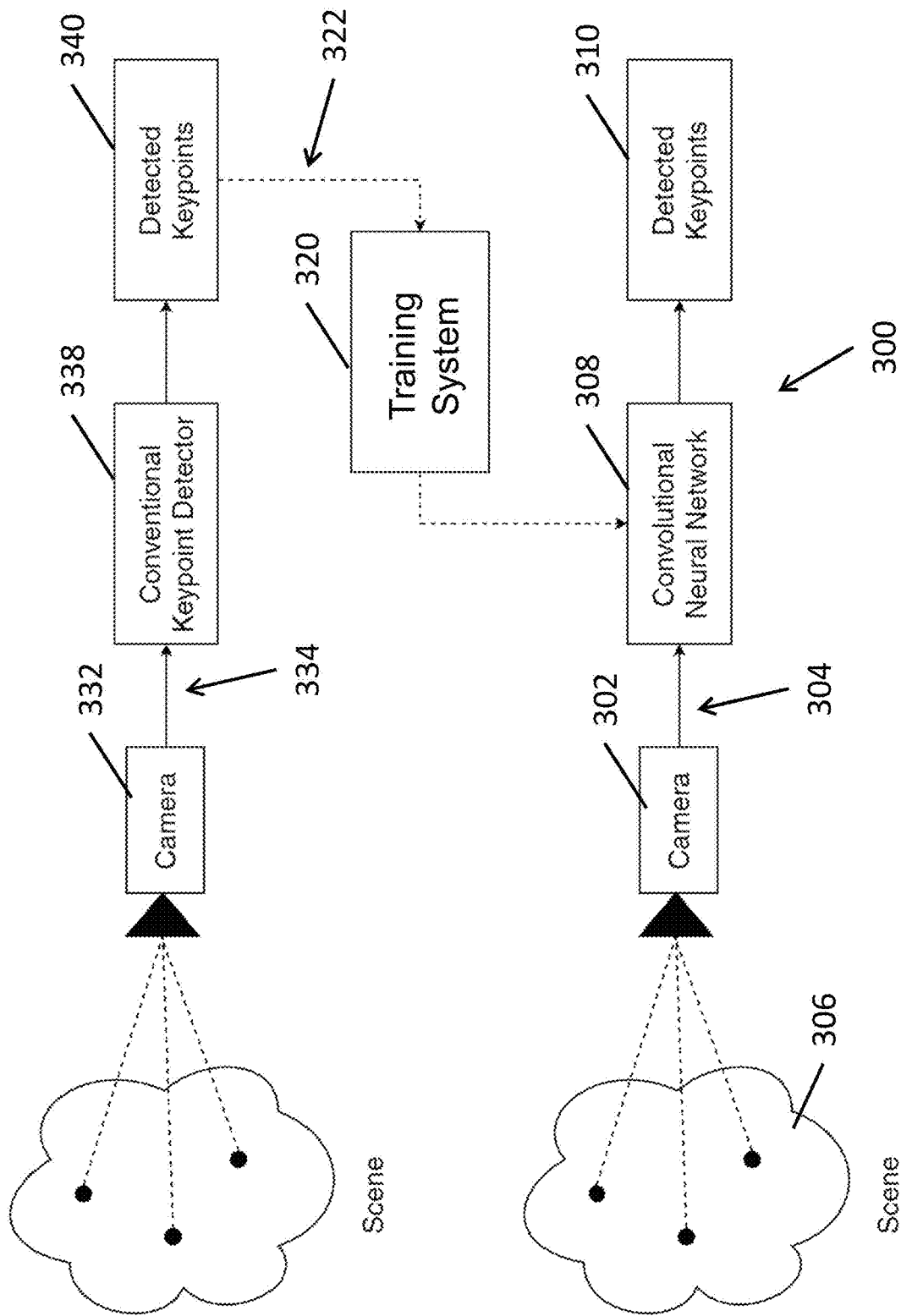
FIG. 3 is a schematic block diagram illustrating the training and operation of a keypoint detection system according to one embodiment of the present invention.

FIG. 3 is a schematic block diagram illustrating the training and operation of a keypoint detection system according to one embodiment of the present invention. As shown in FIG. 3, a keypoint detection system 300 according to embodiments of the present invention may be implemented using a convolutional neural network. A camera 302 captures images 304 of a scene 306. The captured images 304 are supplied as input to the convolutional neural network 308, which outputs detected keypoints 310 of the captured images 304. The detected keypoints 310 of the convolutional neural network 308 may be represented as, for example, a bitmap having substantially the same dimensions as the captured images, where the value of the output bitmap indicates whether or not the corresponding pixels of the supplied image are a keypoint (e.g., using a 1 or 0, respectively, or a continuous or floating point value ranging from 1 to 0, or a value within a range, such as 255 to 0, indicating an estimate or a likelihood that the pixels correspond to a keypoint).

As shown in FIG. 3, the convolutional neural network 308 may be trained using a training system 320. The training system 320 may include, for example, a conventional computer system (including, for example, one or more computer processors, graphical processing units, tensor processing units, and the like). The training system 320 may be used to compute the weights of connections between neurons of the convolutional neural network based on training data, as will be discussed in more detail below.

The training data 322 may be generated by a conventional keypoint detector 338. For example, training image data 334 may be captured by a camera 332 (e.g., the same camera 302 as is used for the computer vision system 300, a substantially identical camera, or a different camera). In some instances, training image data 334 may also be synthesized using, for example, 3-D modeling and rendering systems. The training image data 334 is then supplied to a conventional keypoint detector 338, such as the aforementioned KAZE, Accelerated-KAZE (AKAZE), SIFT, SURF, and the like (e.g., implemented on a computer system including a general purpose processor and memory) to generate training detected keypoints 340.

In other embodiments of the present invention, training detected keypoints 340 are generated manually (e.g., by a human user). For example, in one embodiment, training image data 334 (e.g., an image) is displayed to a user, and a user interface (e.g., a graphical user interface) receives, from the user, positions (e.g., pixels or regions of pixels) of the training image data that the user has determined to be keypoints 340 of the training image data 334. Manually generating training detected keypoints 340 may be useful for specialized cases in which it is easier and faster for a human operator to identify keypoints than to develop a computer algorithm to detect keypoints. For example, in the case where the objects in the scene are expected to always be boxes and keypoints are the corners of the boxes and/or known fiducials that will always be present on the boxes (e.g., a label affixed to the box), a human user can generate keypoints by manually selecting those known locations in a set of images. (Additionally, these manually generated training data can be generated from human users through crowdsourcing systems such as Amazon Mechanical Turk® and reCAPTCHA.

In some embodiments of the present invention, the training detected keypoints 340 includes both manually generated training detected keypoints and keypoints detected by one or more conventional keypoint detectors 338.

The training detected keypoints 340 are then supplied, with the corresponding training image data 334, to the training system 320 to perform the training, which will be discussed in more detail below.

Some aspects of embodiments of the present invention relate to a CNN architecture having a small footprint, which is better suited for application in embedded devices, which hare typically resource constrained (e.g., limited in computing capabilities and limited in energy usage). Accordingly, some embodiments of the present invention relate to a CNN having a three-layer architecture using separable convolutional kernels characterized by highly quantized filter weights, although embodiments of the present invention are not limited thereto.

In some embodiments of the present invention, a keypoint detection system is designed to be configured to approximate the behavior of any given keypoint detector (e.g., by setting the weights of the neural network appropriately), independently of the actual processing performed by the original detector (e.g., explicitly calculating a difference of Gaussians). Given a generic input image I, let $\{p_i\}$ be the set of keypoints (pixels) that would be selected by a particular keypoint detection algorithm. A keypoint detection system in accordance with embodiments of the present invention is programmed or configured or trained such that it outputs a set of pixels $\{\bar{p}_i\}$ that are, on average, very close in distance to the original keypoints $\{p_i\}$. In other words, a keypoint detection system according to embodiments of the present invention is configured to approximate the output of a given keypoint detector. In some embodiments, the internal structure of the keypoint detection system is fixed and independent of the specific keypoint detector that it is configured to emulate or approximate—only the parameters of the system are changed in order to obtain the desired behavior, thereby enabling dynamic reconfiguration of the keypoint detection system according to embodiments of the present invention to adapt to changing needs or tasks.

Figure 4:
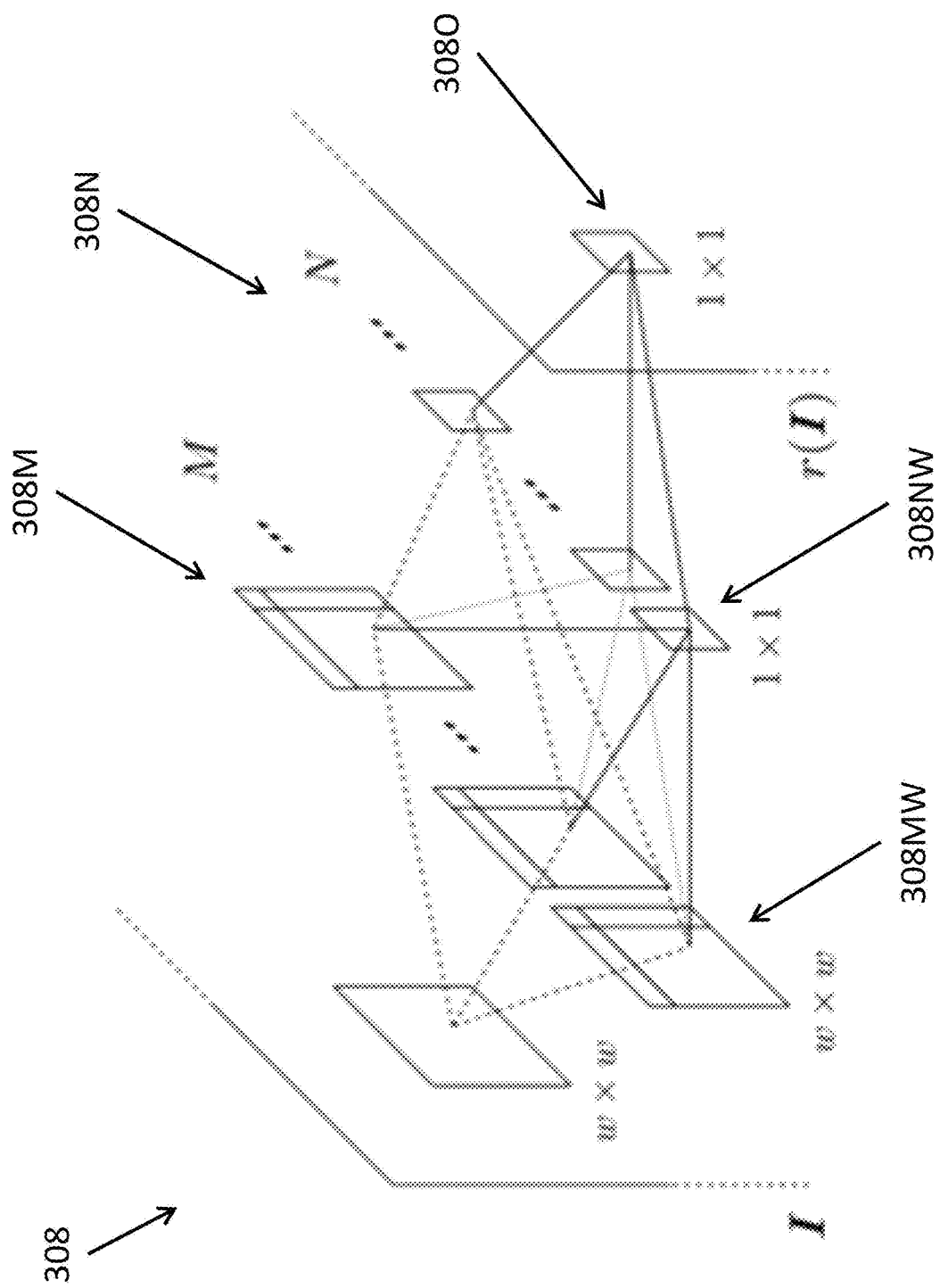
FIG. 4 is a schematic diagram illustrating the structure of a convolutional neural network configured to detect keypoints according to one embodiment of the present invention.

FIG. 4 is a schematic diagram illustrating the structure of a convolutional neural network 308 configured to detect keypoints according to one embodiment of the present invention. As shown in FIG. 4, I refers to the input image (e.g., one of the images 304) and r(I) refers to the keypoint response output. In some embodiments, the keypoint response output r(I) has the same dimensions as the input image I. The keypoint response output r(I) gives a score representing how likely that pixels is an "interesting" point, e.g., a keypoint, according to the learned detector. In the embodiment shown in FIG. 4, layers 308M and 308N are situated between the input image/and the keypoint response output r(I). Each window 308MW or 308NW (having dimensions w×w or 1×1, respectively) shown in FIG. 4 corresponds to a convolution operation. In some embodiments, the filters applied to the first layer 308M are separable.

Each layer of the CNN 308 is fed with one or more images and performs one or more convolutions with these images. The output of some of these convolutions may be linearly combined and added to a constant (a "bias") before input to an activation function (e.g., a non-linear activation function). More specifically, the n-th layer is fed with N(n) images $\{I_i^n\}$ (where the images are indexed by the subscript i) and produces N(n+1) images $\{I_j^{n+1}\}$, indexed by the subscript j, as follows:

$$I_j^{n+1} = \phi^n\left(\sum_{i=1}^{N(n)} I_i^n * h_{i,j}^n + b_j^n\right) \quad (1)$$

In the expression above, $h_{i,j}^n$ represents a convolutional kernel (impulse response) with support of $(w_{i,j;x}^n \times w_{i,j;y}^n)$ pixels, with the symbol '*' representing a two-dimensional (2-D) convolution. More precisely, the convolution of image I with a kernel h produces an image $\bar{I}$ (or r(I)) as by:

$$\bar{I}(x, y) = \sum_{\bar{x}} \sum_{\bar{y}} I(x-\bar{x}, y-\bar{y}) \cdot h(\bar{x}, \bar{y}) \quad (2)$$

where $\bar{x}$ and $\bar{y}$ are indices referring to positions within the convolutional kernel.

In Equation (1), above, $b_j''$ represents a constant (or bias), and $\phi''(\cdot)$ represents a non-linear operation or activation function applied independently and uniformly on all image pixels (e.g., a rectifier linear unit ReLU: $\phi(x)=\max(0, x)$). The architecture shown in FIG. 4 has three layers, with all kernels in the second and third layer having support of 1×1 pixels, and with N(1)=N(4)=1 (in other words, the whole network 308 takes one image I in input, and produces one image r(I) as output.) In some embodiments, $\phi^3(\cdot)$ (the activation function for the third layer) is the identity operator.

The overall network 308 acts as a detector of a set of features whose cardinality is determined by the hyper-parameter N and their complexity by M, respectively corresponding to the number of convolutional filters in the second 308N and first layer 308M. Each of these features contributes to the final response output with a relative (learned) strength, while the hyper-parameter w controls the amount of local spatial information used to define and detect the features (e.g., by defining the size of the w×w convolutional kernel or window in the first layer 308M). Formally, a network according to one embodiment of the present invention can be described by the following function:

$$r(I) = \sum_{i}^{N} a_i \phi \left( \sum_{j}^{M} c_{ij} \phi(e_j f_j^T * I + g_j) + d_i \right) + b \quad (3)$$

Equation (3) above can be interpreted as a non-linear regressor by replacing the input image I with a w×w patch p reshaped as a vector, the convolution operation '*' with a dot product, each of the M (in some embodiments, separable) convolutional kernels $e_j f_j^T$ with its relative vector-shaped representation and the output r(I) with a single scalar response output r(p) for the given input patch.

Referring back to Equation (3), the parameters M, N, and w are hyper-parameters which control the complexity of the CNN and its relative approximation capabilities, while a, b, c, d, e, f, and g are learned parameters calculated during a training process, as described in more detail below.

In some embodiments of the present invention, in order to reduce the computational load of implementing the CNN, the convolutional kernel can $h_{i,j}''$ is X-Y separable, meaning that the 2-D convolutions can be implemented as a cascade or sequence of two one-dimensional (1-D) convolutions, each of which uses a 1-D kernel (a kernel with support only on one image row or one image columns). In other words, a 2-D kernel h(x, y) with support of $w_X \times w_Y$ pixels is separable if it can be written as $h(x, y) = h_X(x) \cdot h_Y(y)$, where X(x) has support of $w_X$ pixels in a row, and $h_Y(y)$ has support of $w_Y$ pixels in a column. Then, the convolution operator with h(x,y) can be written as: $I*h=(I*h_X)*h_Y$. In other words, a separable 2-D convolutional kernel can be implemented by first applying a 1-D kernel along a first direction (e.g., a row direction) and then applying a second 1-D kernel along a second direction (e.g., a column direction).

While the original convolution I*h with a 2-D kernel h(x,y) would typically require $w_X \cdot w_Y$ operations per pixel, implementing the kernel as a separable cascade requires only $w_X + w_Y$ operations per pixel, thus realizing a substantial reduction in the associated computational cost.

Accordingly, in some embodiments of the present invention, the first layer 308M of the network 308 includes of M convolutional filters of size w×w, generated by corresponding separable filters (see, e.g., A. Sironi, B. Tekin, R. Rigamonti, V. Lepetit, and P. Fua. Learning separable filters. *IEEE Transactions on Pattern Analysis and Machine Intelligence*, 37(1):94-106, January 2015.). Referring back to Equation (3), e and f are vectors of size w that correspond to each separable filter and corresponds to the case where $h_{i,j}''=e_j f_j^T$.

The second layer 308N is made of N 1×1 convolutional filters, which perform N different linear combinations of the outputs produced by the first layer. The last layer 308O linearly combines the N outputs to produce the final response output r(I). A non-linear activation function a (such as ReLU) is applied between the layers to allow the network to approximate non-linearity's.

A single instance of the network computes a single response function r(I), meaning that a separate CNN needs to be instantiated for each needed scales in order to compute the response for the whole scale space. (In other words, keypoints may appear at different scales in the input image data, but the CNN is trained to operate at only a single scale. Therefore, in order to cover a range of possible scales at which the keypoints may appear in the input images, the input images may be scaled to various sizes.) The CNN acts as an end-to-end image-to-response function, meaning that no pre-processing of the input image is needed apart from image resizing according to the specific scale to be computed. To perform the keypoint detection, a non-maxima suppression algorithm can be run on the response maps after these are generated from the neural networks.

In some embodiments, the output r(I) of the network is an image with the same size as the input, with pixels taking values over a continuous (or non-binary) range. In order to obtain individual keypoints, standard image processing operations (thresholding, non-maximum suppression) are used to transform this image into a binary image, where non-zero pixels represent the detected keypoints.

In one embodiment, a neural network architecture where N=16, M=16 and w=15 was experimentally tested and found to provide a good compromise between size, performance, and trainability. However, embodiments of the present invention are not limited thereto.

While a CNN having three layers is described herein in the context of a particular activation functions and a particular convolutional kernel, embodiments of the present invention are not limited thereto and may be implemented with different CNN architectures.

Training a Convolutional Neural Network Keypoint Detector

As noted above, one goal of embodiments of the present invention is to use a convolutional neural network to approximate the output of a conventional keypoint detector such as KAZE or SIFT. Using a CNN in this way can significantly reduce the computational complexity and energy usage for when computing keypoints, especially when implemented on hardware that is well-suited to realizing neural networks such as graphics processing units (GPUs), and other vector processors, customized field programmable gate arrays (FPGAs), and application specific integrated circuits (ASICs) that are designed specifically to run neural networks such as Google® tensor processing units (TPUs) and neuromorphic hardware such as IBM® TrueNorth chip. In some embodiments of the present invention, a processor includes a system-on-chip (SoC) which may include an integrated GPU, where the integrated GPU is configured to implement the CNN.

One aspect of embodiments of the present invention relates to learning the output of an arbitrary keypoint detection algorithm such as KAZE or SIFT. The parameters of the convolutional neural network, such as filter kernels $\{h_{i,j;x}^n, h_{i,j;H}^n\}$ and constants $\{b_j^n\}$ (discussed above) are used to control its behavior such that the CNN performs in a manner that approximates the output of a conventional keypoint detector. This can be achieved (or "learned") by a training procedure, in which the convolutional neural network is presented with a set of training images, as well as with the output of the conventional keypoint detector.

Conventional keypoint detectors such as KAZE or SIFT generally share the trait that their final outputs are a set of detected keypoints, and it may be possible to learn the specific response as-is from the sampled outputs of a given conventional keypoint. However, the different nature of the operators used by the different keypoint detectors defining their response functions (e.g., determinant of the Hessian, difference of Gaussians, and the like) makes their response domains inconsistent, which may introduce an additional level of algorithm-dependent complexity. Such additional complexity may make it more difficult to apply the convolutional neural network system according to embodiments of the present invention more broadly to a wide range of keypoint detectors and may also make it more difficult to reconfigure the neural network to implement (or mimic or approximate) different keypoint detectors. Furthermore, current or future learning-based detection algorithms may use higher level definitions of keypoints that may depend on features such as position and scale instead of merely image-based response functions (see the features described with respect to structure from motion techniques in, e.g., W. Hartmann, M. Havlena, and K. Schindler. Predicting matchability. In 2014 *IEEE Conference on Computer Vision and Pattern Recognition*, pages 9-16, June 2014 and K. M. Yi, E. Trulls, V. Lepetit, and P. Fua. LIFT: Learned Invariant Feature Transform. In *Proceedings of the European Conference on Computer Vision*, 2016.)

In addition, learning directly from the output of a conventional keypoint detector may also be difficult because the output of such detectors is typically binary, as indicating whether a particular pixel is a good keypoint or not. Therefore, these outputs lack a directly-computable smooth response function.

Accordingly, one aspect of embodiments of the present invention relates to response functions that are defined for every pixel of the input image, but that rely only on the detected keypoints as well as their position and scale, as described in more detail below. Such response functions can be used to generate training data from an arbitrary number of input training images. In some embodiments, a neural network is trained to approximate the output of the combination of multiple existing keypoint detection algorithms. As a more specific example, the CNN may be trained to output the logical OR of multiple different keypoint detectors, in other words, all keypoints that would be found by any one of the different keypoint detectors. As another example, the CNN may be trained to output the logical AND of multiple different keypoint detectors, e.g., only those keypoints that would be detected in common by the different keypoint detectors)

Furthermore, some aspects of embodiments of the present invention relate to systems and methods for training a CNN keypoint detector that is capable of matching or approximating the output of a conventional keypoint detector. Generally speaking, training data can be obtained by running a conventional keypoint detector on a set of training images, so the amount of labeled training data is generally not a limiting factor. Accordingly, some aspects of embodiments of the present invention relate to accelerating the training process by sampling the space of available training image data to generate a set of training data that improves (e.g., increases) the representation of positive labels (keypoints) and high frequency components of the function in the sampled labels set. By increasing the fraction or proportion of the training data that corresponds to positive labels and high frequency components, aspects of embodiments of the present invention obtain a relatively small, but representative, set of labels which allows the neural network to learn the desired keypoint detection function quickly and reliably, thereby enabling good generalization and fast learning time.

According to one embodiment of the present invention, a two-stage approach is used to train the convolutional neural network, where a different training set is used in each stage. During the first stage, a first set of parameters using the first training set. The first set of parameters is used to configure the convolutional neural network, and the output of the convolutional neural network is compared with the output of the corresponding conventional keypoint detector. Portions of the training data that correspond to portions of the output of the CNN that are underrepresented (e.g., inconsistent with the output of the conventional keypoint detector) are then sampled and added to the first training set in order to improve the quality in those underrepresented areas.

Figure 5:
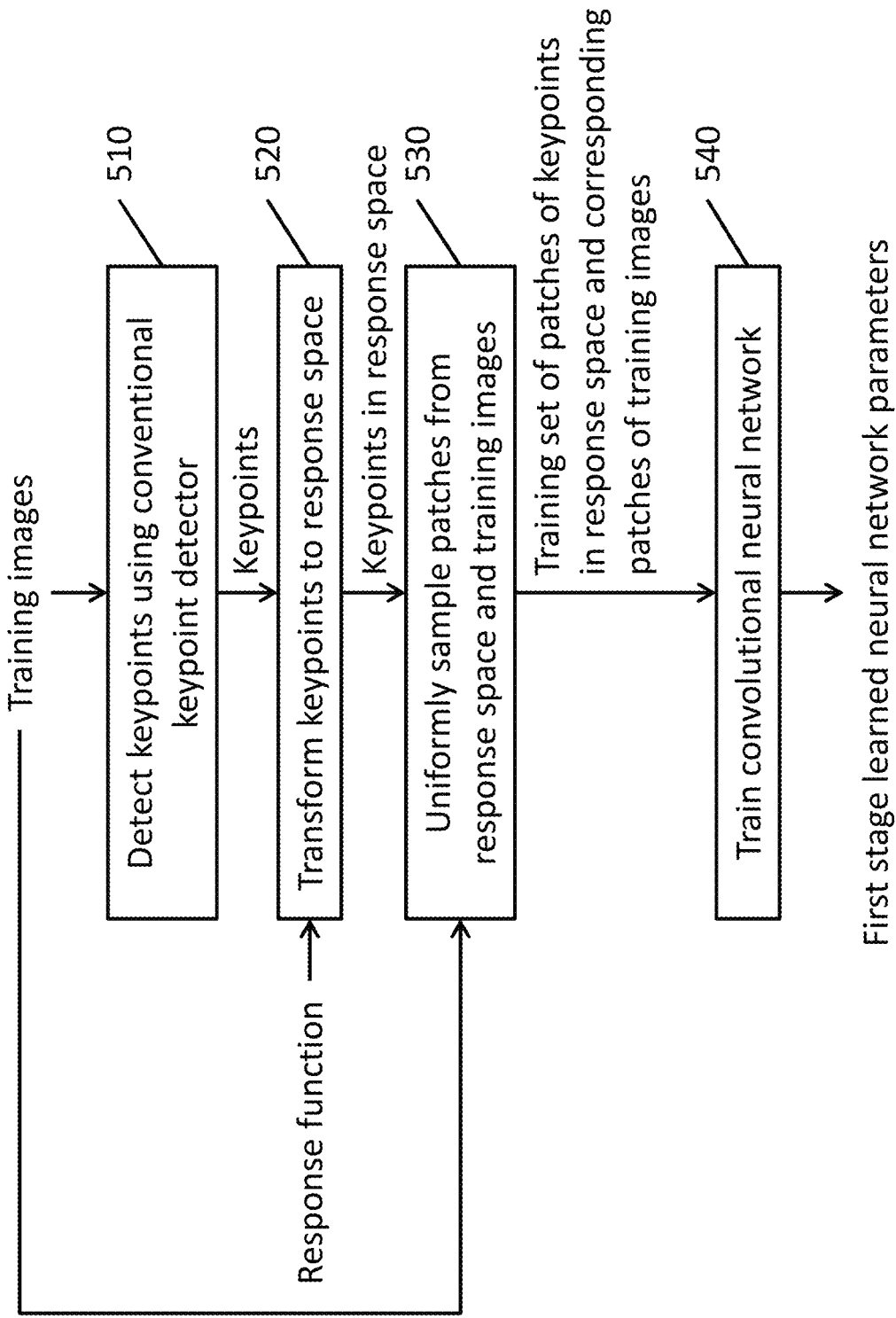
FIG. 5 is a flowchart of a method for a first stage training a keypoint detector convolutional neural network according to one embodiment of the present invention.

FIG. 5 is a flowchart of a method for a first stage of training a keypoint detector convolutional neural network according to one embodiment of the present invention. In operation 510, the training system 320 supplies training images are supplied to a conventional keypoint detector such as AKAZE, SIFT, or the like, or a combination of such conventional keypoint detectors such as a logical OR or a logical AND of multiple keypoint detectors, or a weighting of multiple keypoint detectors. For each training input image, the conventional keypoint detector generates a set of detected keypoints in the input training image, which is generally represented as a binary-valued bitmap that identifies coordinates of the input image that correspond to keypoints.

Label Generation

As noted above, one aspect of embodiments of the present invention relates to training a convolutional neural network (CNN) keypoint detector using a response function that is defined for every pixel of the image, where such a response function is a function of a set of keypoints detected by a conventional keypoint detector algorithm, rather than being computed as a function of the input image itself.

More concretely, in one embodiment of the present invention, convolutional neural network takes a w×w patch of the image as input and generates a single value as output indicating a likelihood that the patch contains a keypoint, e.g., at the center of the patch. Accordingly, the training data generated from the response of the conventional keypoint detector includes pairs of input patches (having dimensions w×w) and output labels (e.g., the determination of the conventional keypoint detector as to whether or not the pixel at the center of the patch corresponds to a keypoint).

In these embodiments of the present invention, the response function is used to generate labels for the training data by converting the detected keypoints output by the conventional keypoint detector to a continuous response space, thereby decoupling of the framework for training the CNN from the details of the underlying conventional keypoint detector algorithm, and thereby allowing embodiments of the present invention to generate training data for learning any conventional keypoint detector and also allowing for combinations of keypoint detectors to be learned.

According to one embodiment, given a point p as a point (x, y) in the response to be generated and K as the set of keypoints returned by the keypoint detector to be approximated by the CNN, the response r̂ is defined as:

$$\hat{r}(p, \mathcal{K}) = \max_{k \in \mathcal{K}} A \exp\left(-\frac{\|p-k\|^2}{2\sigma^2}\right) \quad (4)$$

Figure 6A:
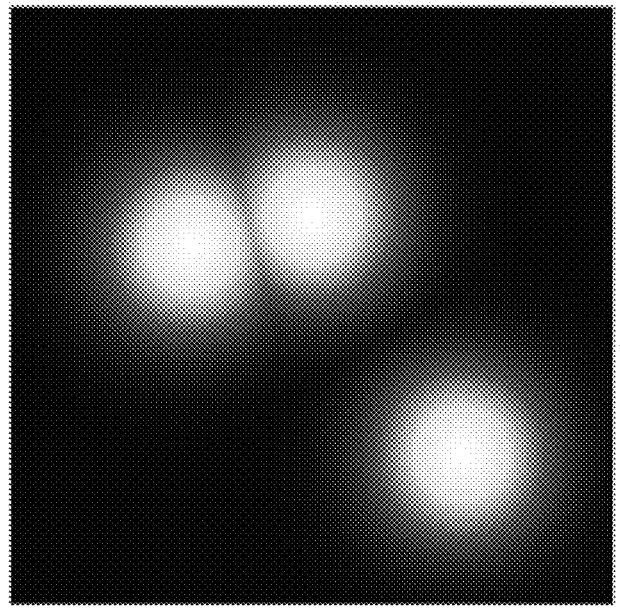
FIG. 6A is an example image with detected keypoints highlighted with circles.
Figure 6B:
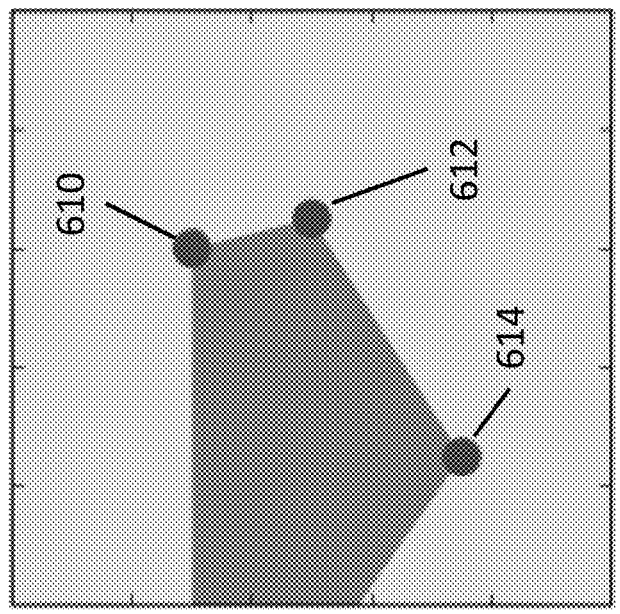
FIG. 6B is a relative generated response function for the detected keypoints according to one embodiment of the present invention, where the intensity of the color indicates the magnitude of the response function at a given point.

FIG. 6A is an example image with detected keypoints highlighted with circles 610, 612, and 614. FIG. 6B is a relative generated response function for the detected keypoints according to one embodiment of the present invention, where the intensity of the color indicates the magnitude of the response function at a given point. As shown in FIG. 6B, the resulting response function r̂ imposes a two-dimensional Gaussian over each keypoint (610, 612, and 614 of FIG. 6A), where the intensity of the color indicates the magnitude of the response function r̂ at a given point. The two-dimensional Gaussian simulates the smoothness of a typical response function of a CNN, where the constants A and σ model the amplitude and the smoothness of the Gaussian, which has the same shape for every keypoint.

In some embodiments, in order to more closely mimic the behavior of a standard response map from a conventional keypoint detector, when p is close to two different is close to two different keypoints and the Gaussians of the two keypoints overlap, the maximum value from the two keypoints is taken (as represented, for example, by the max over k∈K component of Equation (4)). This is because the response of a conventional keypoint detector in the neighborhood of two keypoints would be represented by a blob of substantially uniform intensity, rather than a higher intensity peak. In some embodiments, the strength of the detected keypoints is modeled by an additional coefficient corresponding to the actual response value generated by the conventional keypoint detector (see, e.g., FIG. 9C, described in more detail below).

This form of "shape regularization" is similar to other approaches (see, e.g., Y. Verdie, K. M. Yi, P. Fua, and V. Lepetit. TILDE: A Temporally Invariant Learned DEtector. In *Proceedings of the Computer Vision and Pattern Recognition,* 2015.), but in some embodiments, is enforced at the time of training set generation through the process of applying the labels to the training data, rather than in a loss function as described in Verdie et al. Applying the regularization when generating the training set allows a simpler loss function to be used during the regression operation of the training process (thereby simplifying the training process), and also allowing labels to be defined at every pixel and/or patch in the training image.

Accordingly, in operation 520, the training system 320 applies a response function of the type described above to the detected keypoints to transform the keypoints to "response space."

With the response function defined, the computed labels can be used to train the convolutional neural network to generate a set of learned parameters.

Because aspects of embodiments of the present invention are implemented using a convolutional neural network, and because the CNN processes each patch (having dimensions equal in size to the convolutional kernel, w×w) of its input image independently, the training of the CNN can be performed using patches that are selected from the response map and corresponding patches of the training images.

However, given that training data can be easily generated, aspects of embodiments of the present invention relate to systems and methods for selecting a small, well-distributed set of labels that span substantially the entire response space and that also represents the fine details of the overall function (e.g., in high spatial frequency areas).

In operation 530, the training system 320 generates the first training set by sampling labels (e.g., points) uniformly in the response space and a corresponding set of patches (having dimensions w×w pixels) from the input training images (e.g., the patches that map to the sampled points of the keypoints in response space). This approach differs from the conventional binary "good-bad" sampling mechanism in which only good and bad examples are chosen (such as in Verdie et al.), thereby allowing the CNN to learn the introduced smoothness of the response function r̂ around the keypoints. This can be thought of as using the uniform sampling to add perturbations to a standard binary training set by including image patches in which keypoints are not perfectly centered at a pixel, but instead slightly translated in a random direction determined by the random sampling within the single buckets of the histogram of r̂.

In operation 540, the training system 320 trains a convolutional neural network using the first training set, where the sampled labels from the response space correspond to the target output of the neural network and the patches correspond to the input that generates the target output. A metric is defined to compare the output of the system against the output of the desired keypoint detector, producing a distance value. The parameters can then be tuned to minimize the sum of estimated error distances (magnitude of training keypoint vectors vs. estimated keypoint vectors generated by the neural network) over all training images. Standard minimization algorithms (e.g., stochastic gradient descent and backpropagation) can be used for this purpose.

There are multiple possible metrics that could be employed to compare the output of a network with that of a desired keypoint detector. For example, in one embodiment the target detector is used to compute a set of keypoints, which can be converted to a derived image with pixel values in a continuous domain, where the metric is based on computing a pixel-wise squared difference between the derived image and the output of the convolutional neural network. A possible way to generate such a derived image is by means of the distance transform (see), which assigns to each pixel a value equal to the Euclidean distance to its closest keypoint. The distance transform can be then processed with a pixel-wise operator to obtain the desired result. For example, if D (x, y) is the value of the distance transform at pixel (x,y), one could substitute this value with $\bar{D}$(x, y)=exp(−D(x,y)), resulting in an image with pixel taking values in [0,1], with larger values in the proximity of a keypoint. The network could be trained to generate images I that minimize the distance to $\bar{D}$, defined as:

$$d(\bar{I}, \bar{D}) = \sum_x \sum_y (\bar{I}(x, y) - \bar{D}(x, y))^2 \quad (5)$$

In case of multi-scale detectors, in some embodiments of the present invention, independent training sets are generated per scale by using as input for the response function r̂ only keypoints from the relative scale, and the same network is trained each time from scratch with each training set. This is done in order to be as generic with respect to the chosen keypoint detector (e.g., KAZE), while also ensuring that detectors which do not operate on a simple Gaussian-based scale space are correctly approximated. An example is KAZE, which operates on a non-linear diffusion scale space with its parameters changing across the different scales. In this case, embodiments of the present invention approximate the different diffusion parameters by considering each scale independently during training time.

The result of the training process is a set of parameters for configuring the CNN, such as the parameters a, b, c, d, e, f, and g of Equation (3), above.

Figure 9C:
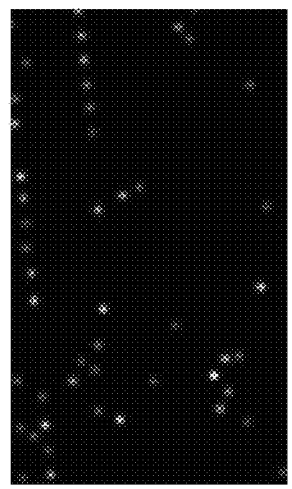
FIG. 9C is the r̂ generated Gaussian response according to one embodiment of the present invention.
Figure 9F:
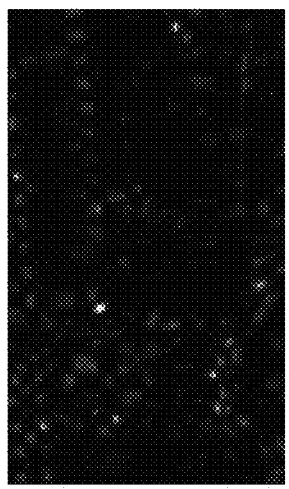
FIG. 9F is the response inference from the trained convolutional neural network after training set reinforcement in accordance with embodiments of the present invention.
Figure 9B:
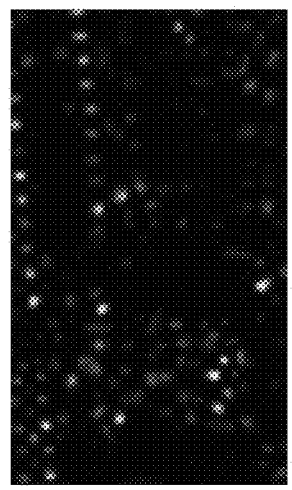
FIG. 9B is an example of the AKAZE response to the input image shown in FIG. 9A.
Figure 9E:
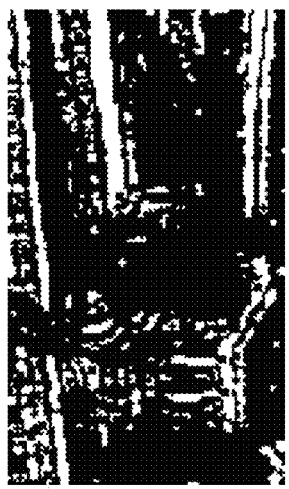
FIG. 9E is a thresholded absolute difference of FIG. 9D with FIG. 9C as described in Equation 3.
Figure 9A:
FIG. 9A is an example input image.
Figure 9D:
FIG. 9D is the response inference from the network after an initial training stage.

Once the first stage of the training is performed, the learned parameters can be used to configure the CNN to compute a first approximation of the response function $\hat{r}$ (see, e.g., FIG. 9D). While this first approximation from the first stage of the training captures the keypoints identified by the target conventional keypoint detector (see FIG. 9B), the first approximation also includes false positives (in this example, along edges). This is because the first training set lacks samples which describe some specific components of the response function, and the failure to capture these components leads to false positives (false detections of keypoints).

Figure 7:
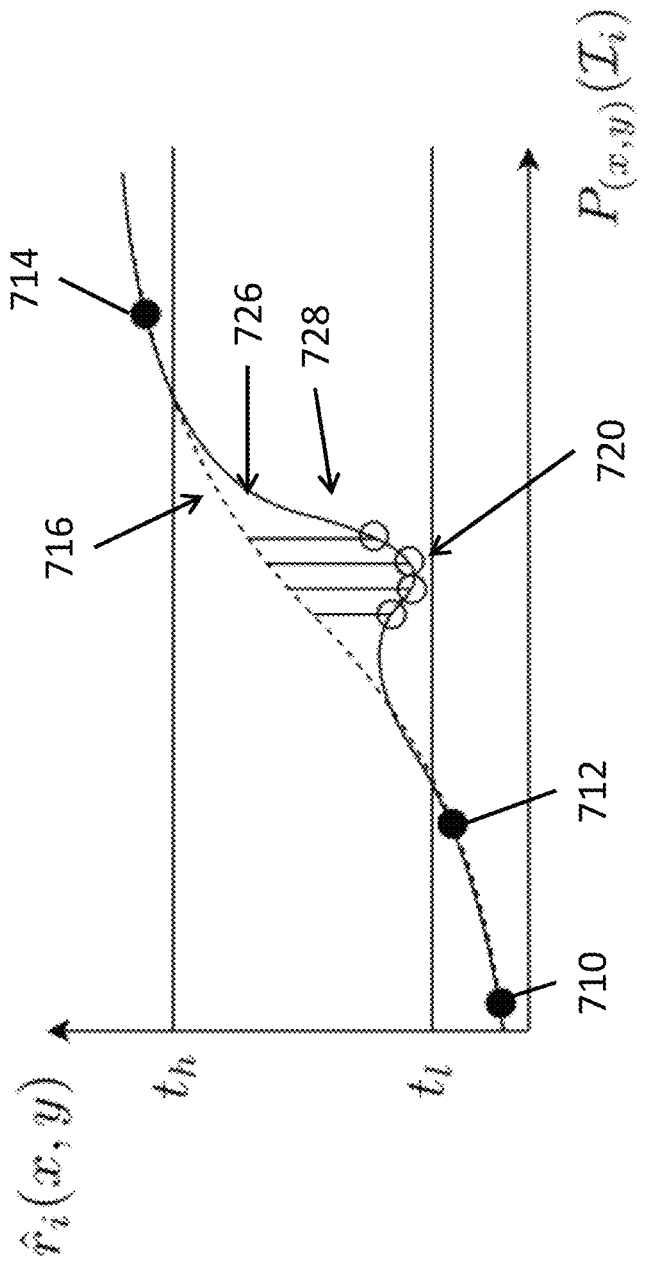
FIG. 7 is an illustration, as a simplified one dimensional problem, of training set reinforcement according to one embodiment of the p resent invention.

FIG. 7 is an illustration, as a simplified one dimensional problem, of training set reinforcement according to one embodiment of the p resent invention. The points in black 710, 712, and 714 are samples of the response function $\hat{r}$ from the first training set. (For the sake of clarity, it is considered as an example of a classic good-bad sampling approach in which only keypoint and non-keypoint patches are sampled according to simple thresholds, although this concept also generalizes to uniform response-space sampling in accordance with some embodiments of the present invention.) However, interpolating between the sampled points in black 710, 712, and 714 leads to the dotted line 716 which differs from the actual response function $\hat{r}$ shown with the solid line. As such, the sampled information 710, 712, and 714 is not sufficient to represent the overall response function, as some specific components (e.g., the dip 728) are missing.

According to one embodiment, a second stage of training involves reinforcing the training set with additional samples (represented by unfilled circles 720 in FIG. 7) to capture the under-represented components (e.g., the dip of the solid line shown in FIG. 7), enabling a better representation of the overall response function $\hat{r}$ 726.

Figure 8:
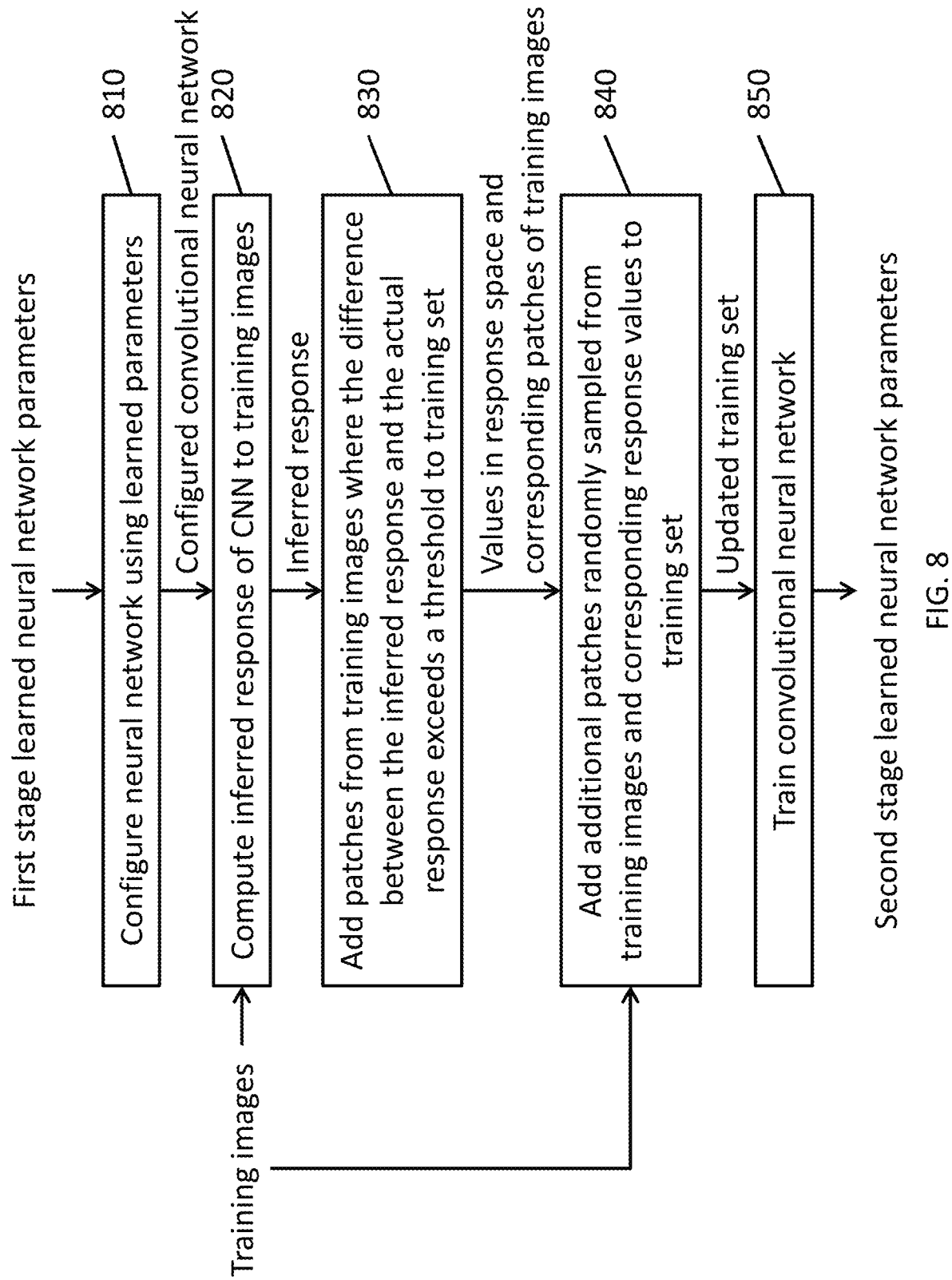
FIG. 8 is a flowchart of a method for a second stage training of a keypoint detector convolutional neural network according to one embodiment of the present invention.

FIG. 8 is a flowchart of a method for a second stage training of a keypoint detector convolutional neural network according to one embodiment of the present invention. The training system 320 identifies points in the image as potential candidates to be added to the training set. Broadly speaking, this involves thresholding the absolute difference of the inferred function and the actual function. Specifically, in one embodiment, the following binary function is used to define whether or not a point in the image is a good candidate for being part of the reinforcement set:

$$C_i(x,y) = |T_i(\hat{r}_i(x,y)) - T_i(\hat{r}_i^0(x,y))| \quad (6)$$

where $T_i$ is a thresholding function defined as:

$$T_i(x) = \begin{cases} 1 & \text{if } x \geq \max(\hat{r}_i)/\theta \\ 0 & \text{otherwise} \end{cases} \quad (7)$$

and where $\hat{r}_i^0$ is the inferred response from the neural network (e.g., the dashed line shown in FIG. 7). The parameter θ controls the number of responses above the threshold. Applying the thresholding function $T_i$ before computing the absolute difference (for example, computing $|T_i(\hat{r}_i(x, y)) - T_i(\hat{r}_i^0(x, y))|$) instead of applying the thresholding function $T_i$ after computing the absolute difference (e.g., computing $T_i(|\hat{r}_i(x, y) - \hat{r}_i^0(x, y)|)$) helps to reinforce mostly points which are actually considered during the eventual keypoint detection stage, because thresholding is usually applied to the response before performing non-maxima suppression.

According to one embodiment of the present invention, in operation 810, the training system 320 configures the neural network based on the first stage learned parameters (e.g., the output of operation 540). In operation 820, the training system 320 supplies training images to the configured CNN to compute the response of the CNN, as configured based on those first stage learned parameters.

In operation 830, the training system 320 selects a number of patches from among the patches for which for which $C_i(x, y)$ is a positive value (e.g., the patches centered at (x, y)), where the number of patches selected is equal to the number of patches selected in operation 530 (e.g., using uniform sampling) of the first stage of the training process.

In addition, in operation 840, for every patch added in operation 830, the training system 320 adds another patch, randomly sampled from the whole image, along with its corresponding response. Adding these randomly sampled patches can help in compensating for the over-representation of the critical regions (e.g., around the dip shown in FIG. 7). Accordingly, after operation 840, the updated training set (or second training set) includes three times the number of patches as the first training set.

In operation 850, the training system 320 re-trains the convolutional neural network using the updated training set. In some embodiments, the training begins from scratch (e.g., with random initial values of the parameters). In other embodiments, the training begins with the weights set to the parameters computed during the first stage of training. The result of the retraining is another set of parameters for the CNN. In some embodiments, these parameters are then used to configure a CNN.

In some embodiments of the present invention, the second stage training shown in FIG. 8 is repeated to iteratively update the second stage learned parameters for the CNN until a convergence state is reached. In some embodiments of the present invention, a convergence state is reached when the difference between the response function and the inferred response from the configured CNN falls below a threshold level (e.g., less than a 1% difference between the response function and the inferred response from the configured CNN). In some embodiments of the present invention, a convergence is reached when the no new samples or very few new samples satisfy the condition of equation (6).

FIG. 9A is an example input image, FIG. 9B is an example of the response of a conventional keypoint detector (in this example, AKAZE) to the input image shown in FIG. 9A, FIG. 9C is the response function $\hat{r}$ Gaussian response (according to one embodiment of the present invention) generated from the output of the conventional keypoint detector of FIG. 9B, FIG. 9D is the response inference from the network after the first training stage, FIG. 9E is a thresholded absolute difference of the response inference of FIG. 9D with FIG. 9C as described in Equation 6, and FIG. 9F is the response inference from the trained convolutional neural network after training set reinforcement in accordance with embodiments of the present invention.

As discussed above, while the response inference after the first training stage (shown in FIG. 9D) captures the keypoints found by AKAZE (shown in FIG. 9B), FIG. 9D is also includes many false positives, such as in lines and surfaces of the original image (shown in 9A). On the other hand, after training set reinforcement, the response of the trained convolutional neural network (shown in FIG. 9F) matches or predicts the response of the conventional detector (shown in FIG. 9B) much more closely, thereby illustrating the improvement of the performance of the CNN through retraining with a reinforced training set as described above according to one embodiment of the present invention.

Quantization

Some aspects of embodiments of the present invention relate to the quantization of the network parameters, thereby allowing the use of fixed point arithmetic rather than the more typical floating point arithmetic. Embodiments of the present invention that make use of fixed point arithmetic can be deployed on simpler and more power efficient hardware, thereby enabling lower power consumption and more cost effective implementation. S. Gupta, A. Agrawal, K. Gopalakrishnan, and P. Narayanan. Deep learning with limited numerical precision. In *Proceedings of the 32nd International Conference on Machine Learning (ICML*-15), pages 1737-1746. JMLR Workshop and Conference Proceedings, 2015. describe the use of fixed point computation for training neural networks. In contrast, aspects of embodiments of the present invention relate to "inference-time," e.g., when operating a neural network in forward-propagation to generate a predicted output. Accordingly, in some embodiments of the present invention, the training of the neural network (e.g., operations 540 and 850 of FIGS. 5 and 8) is performed using floating point values.

For the sake of convenience, the notation <IL,FL> will be used herein for describing a fixed point integer with IL integer bits and FL fractional bits.

Interpreting a generic neural network as a series of dot products, fixed point computation is problematic in that the result of a dot product requires a bit width which is larger than the bit width of its input (e.g., the product is larger than its multiplier and its multiplicand). When the output from a dot product is fed to a subsequent dot product, and so forth and so on, the maximum possible width of the result continues to grow, therefore requiring larger numbers of bits for each dot product in the sequence. Specifically, for a dot product of n numbers of width <IL,FL>, the relative result width is ($\log_2$ n+2IL,2FL). In a fixed width system, cropping or truncating this result back to a width of <IL,FL>, allows the system to cope with the possibilities of growing input size, such that all the operators within the network can be consistent to the same input size.

Accordingly, one aspect of embodiments of the present invention relates to the use of a "Convert" function to perform the task of cropping or truncating the output of a dot product.

$$\text{Convert}(x, \langle IL, FL \rangle) = \begin{cases} -2^{(IL-1)} & \text{if } x \le -2^{IL-1} \\ 2^{IL-1} - 2^{FL} & \text{if } x \ge 2^{(IL-1)} - 2^{FL} \\ \lfloor x \rfloor & \text{otherwise} \end{cases} \quad (8)$$

where $\lfloor x \rfloor$ is defined as the largest multiple of $2^{-FL}$ less than or equal to x. The Convert function clips the input value x to the maximum or minimum value representable by <IL, FL> when it saturates, or crops the fixed point precision otherwise. According to some aspects of embodiments of the present invention, the Convert function constrains the total bit width (IL+FL) to be either 8 or 16 bit, while dynamically adapting the specific IL and FL widths according to the minimum needed IL size for each layer, thus maximizing the FL precision. The minimum needed IL size is a function of the maximum value among the parameters of the layer.

Accordingly, in some embodiments of the present invention, the above-defined Convert function is applied when computing a dot product to compute the total input activation to each of the nodes of the layers of the neural network, thereby allowing implementation of the neural network in hardware systems using fixed point arithmetic.

Performance Results

Aspects of embodiments of the present invention were implemented in hardware to measure performance in terms of quality (e.g., accuracy) and computational performance (e.g., speed, area, and power consumption).

The computation approximation capabilities of the implemented embodiment of the present invention was evaluated using a repeatability rate metric, as described, for example, in K. Mikolajczyk, T. Tuytelaars, C. Schmid, A. Zisserman, J. Matas, F. Schaffalitzky, T. Kadir, and L. V. Gool. A comparison of affine region detectors. *International Journal of Computer Vision*, 65(1):43-72, 2005.

To generate the training set for the experiment, the "Roman Forum" dataset from K. Wilson and N. Snavely. Robust global translations with 1DSfM. In *Proceedings of the European Conference on Computer Vision (ECCV)*, 2014. was used. In one instance, the CNN was trained to approximate the output of the AKAZE keypoint detector, and, in another instance, the CNN was trained to approximate the output of the SIFT keypoint detector in order to test the ability to learn the behavior of different keypoint detectors.

Figure 10B:
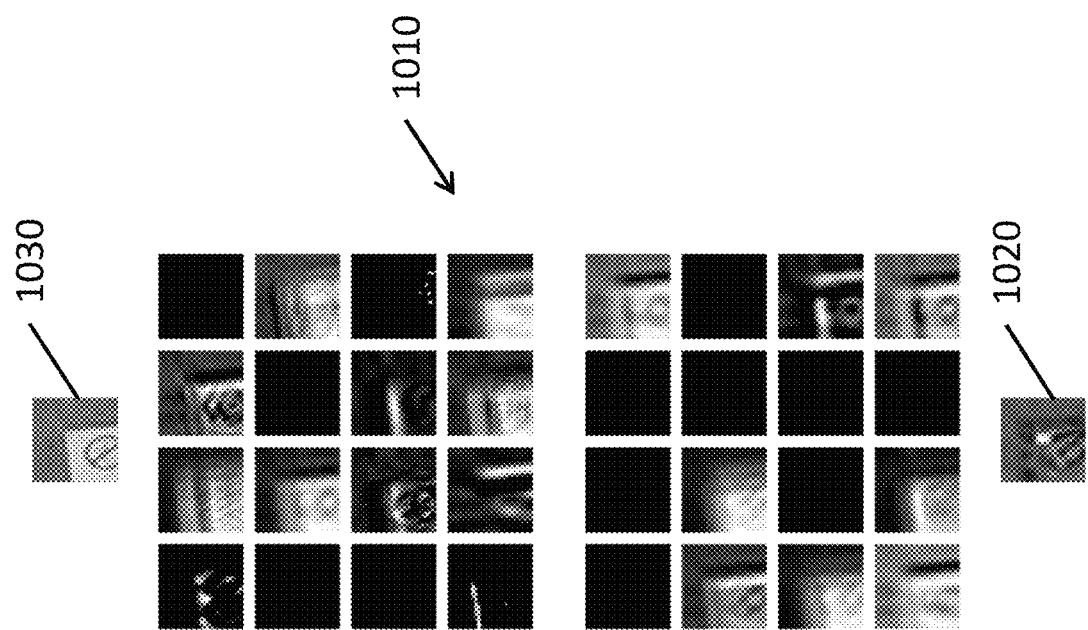
FIG. 10B depicts sample activations and output from a sample image patch supplied to a CNN keypoint detector according to one embodiment of the present invention trained using training data generated by applying the AKAZE keypoint detector to training images.
Figure 10A:
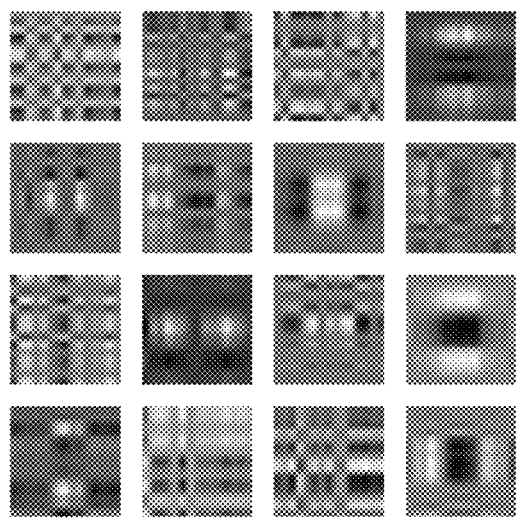
FIG. 10A depicts learned filters from the first layer of a CNN keypoint detector according to one embodiment of the present invention trained using training data generated by applying the AKAZE keypoint detector to training images.

FIG. 10A depicts learned filters from the first layer 308M of the CNN 308 when trained with keypoints generated by AKAZE according to one embodiment of the present invention. FIG. 10B depicts sample activations 1010 and output 1020 from a sample image patch 1030 supplied to a CNN keypoint detector according to one embodiment of the present invention trained using training data generated by applying the AKAZE keypoint detector to training data.

To evaluate the quality of the training process, a first CNN was trained with training data generated using AKAZE to generate a set of learned parameters for approximating AKAZE, and a second CNN was trained with training data generated using SIFT to generate another set of learned parameters for approximating SIFT. The outputs of the CNNs, as configured with AKAZE and SIFT, respectively, were compared against the conventional AKAZE, SIFT, SURF, and LIFT keypoint detectors using the repeatability rate metric referenced above.

Generally, the repeatability rate metric measures the quality of a keypoint detector by applying the keypoint detector to a pair of images having overlapping fields of view are that related by a known homography transformation, and by counting the number of keypoints that are found in both images (e.g., the size of the intersection or overlap of the sets of keypoints found in each image). A keypoint a in one image can be considered to correspond to a keypoint b in the other image if the "overlap error" between the keypoints is sufficiently small, where, in one embodiment, the overlap error is defined by:

$$1 - \frac{R_{\mu_a} \cap R_{H^T \mu_b H}}{R_{\mu_a} \cup R_{H^T \mu_b H}} < \epsilon_O \qquad (9)$$

where $R_\mu$ is the elliptic region defined by $x^T \mu x = 1$, and where H is the homography relating the two images. The union of the two elliptic regions is $R_{\mu_a} \cup R_{H^T \mu_b H}$ and their intersection is $R_{\mu_a} \cap R_{H^T \mu_b H}$.

According to one embodiment, the repeatability rate metric is defined as:

$$\frac{|C|}{\min(|K_1|, |K_2|)} \qquad (10)$$

where |C| is the number of correspondences and $|K_1|$ and $|K_2|$ are the number of keypoints in the portion of the fields of view of the images that overlap (e.g., the region shared by the images). This repeatability rate metric represents the ratio (or fraction) of keypoints that are successfully detected in both images according to the ground truth homography H, over the total number of proposed keypoints found in the shared region.

FIG. 11 depicts quantitative results of the performance of a neural network keypoint detection system according to one embodiment of the present invention against the comparative keypoint detectors. FIGS. 11A and 11B depict to the repeatability rate in the face of increasing levels of blur applied to two different sets of sample images ("bikes" and "trees," respectively), where the horizontal axis relates to the amount of blur and the vertical axis relates to repeatability rate (higher values of repeatability rate are better). As seen in FIGS. 11A and 11B, the performance of the CNN keypoint detector trained on AKAZE data is close to the performance of the standard AKAZE keypoint detector, at a repeatability rate of approximately 0.9 across the blur levels for the "bikes" image and at a repeatability rate of approximately 0.8 across the blur levels for the "trees" image. The CNN keypoint detector trained on SIFT data outperformed the standard SIFT detector across all blur levels (at a repeatability rate of approximately 0.7 versus approximately 0.5, respectively, for the "bikes" image and a repeatability rate of approximately 0.5 versus a repeatability rate of approximately 0.4, respectively, for the "trees" image).

Figure 11A:
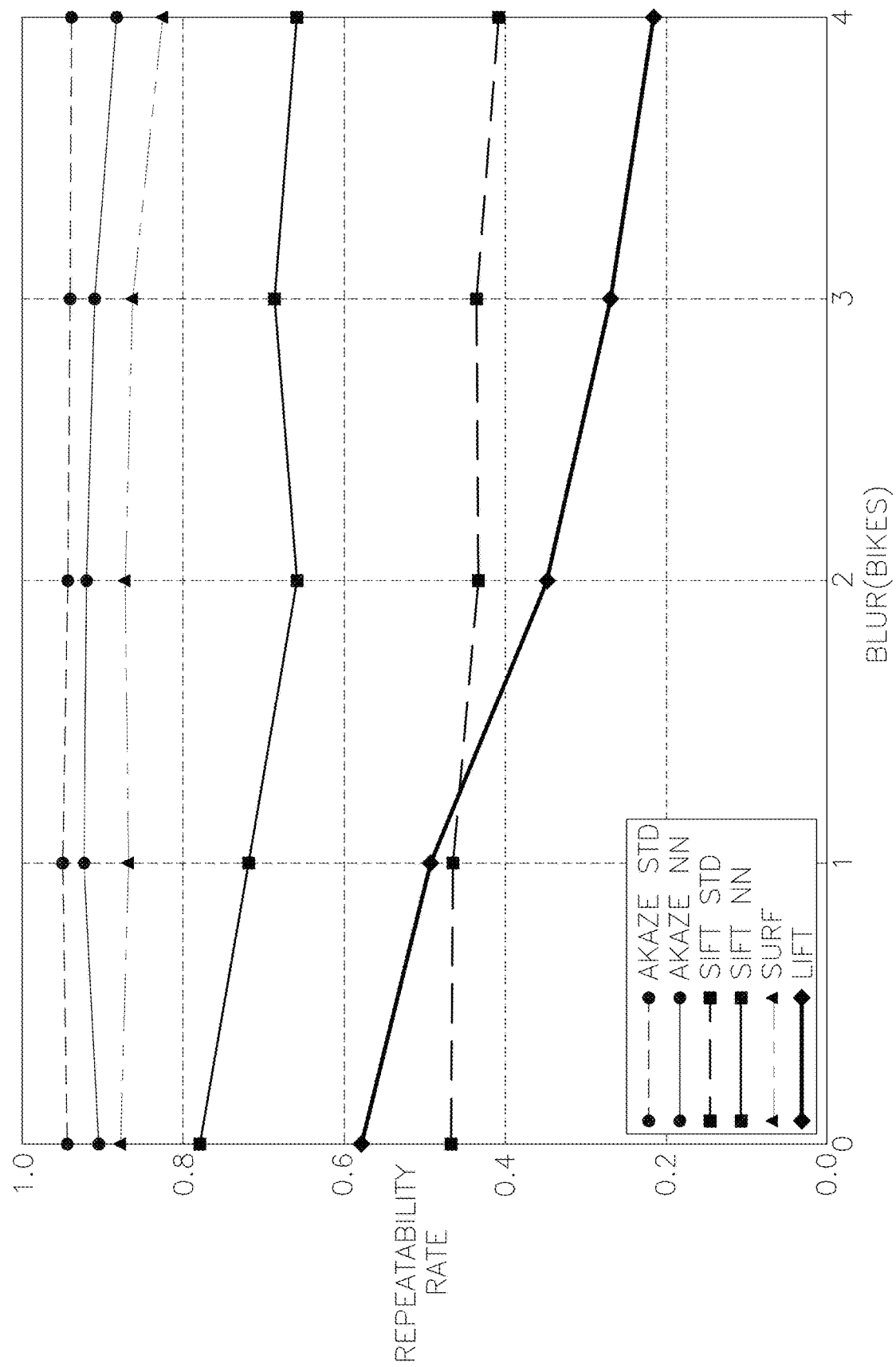
FIGS. 11A, 11B, 11C and 11D depict quantitative results of the performance, in terms of repeatability rate, of different keypoint detectors, including comparative AKAZE, SIFT, SURF, and LIFT keypoint detectors, and convolutional neural network keypoint detectors trained on AKAZE and SIFT according to one embodiment of the present invention.
Figure 11B:
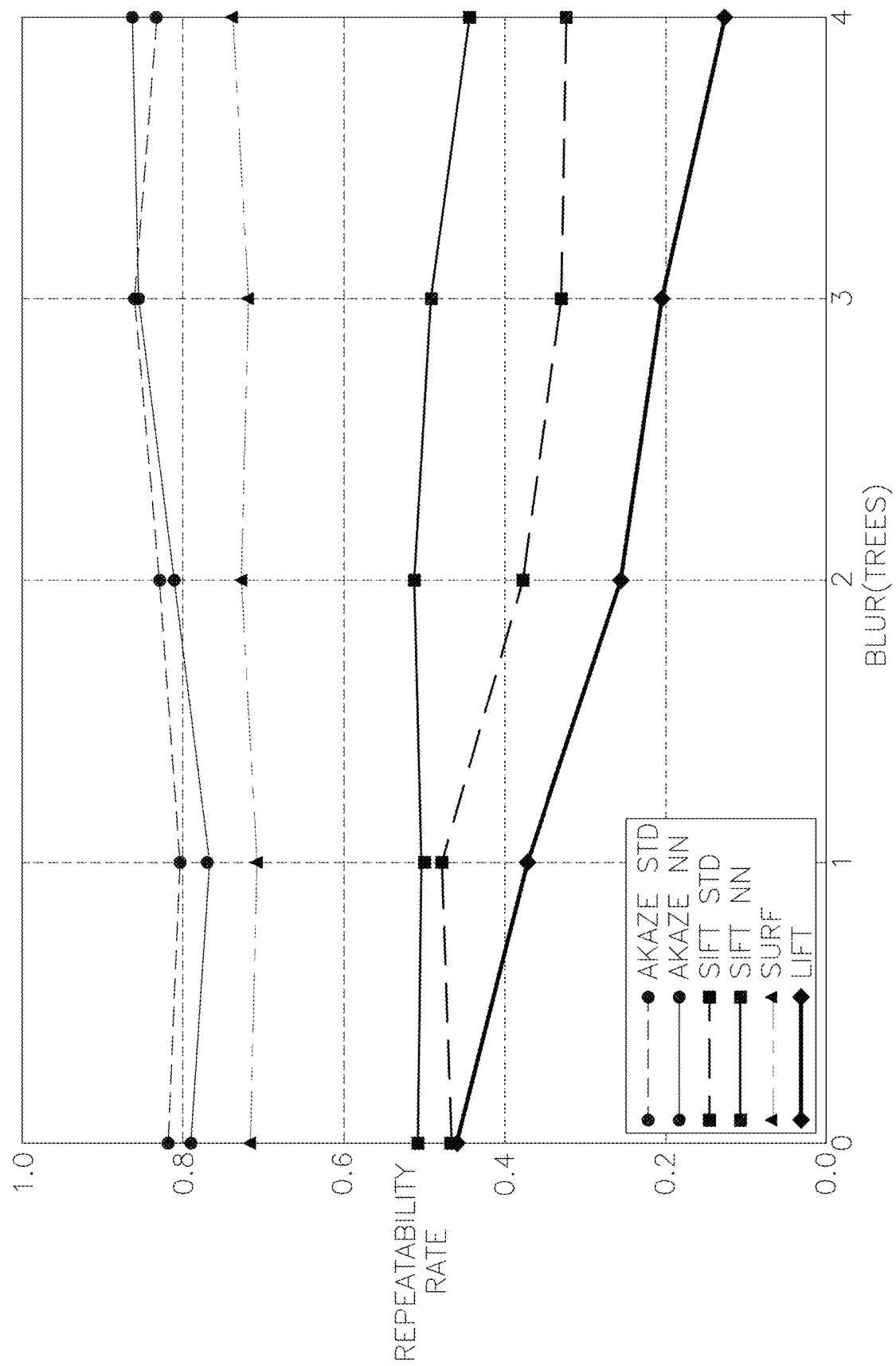
Figure 11C:
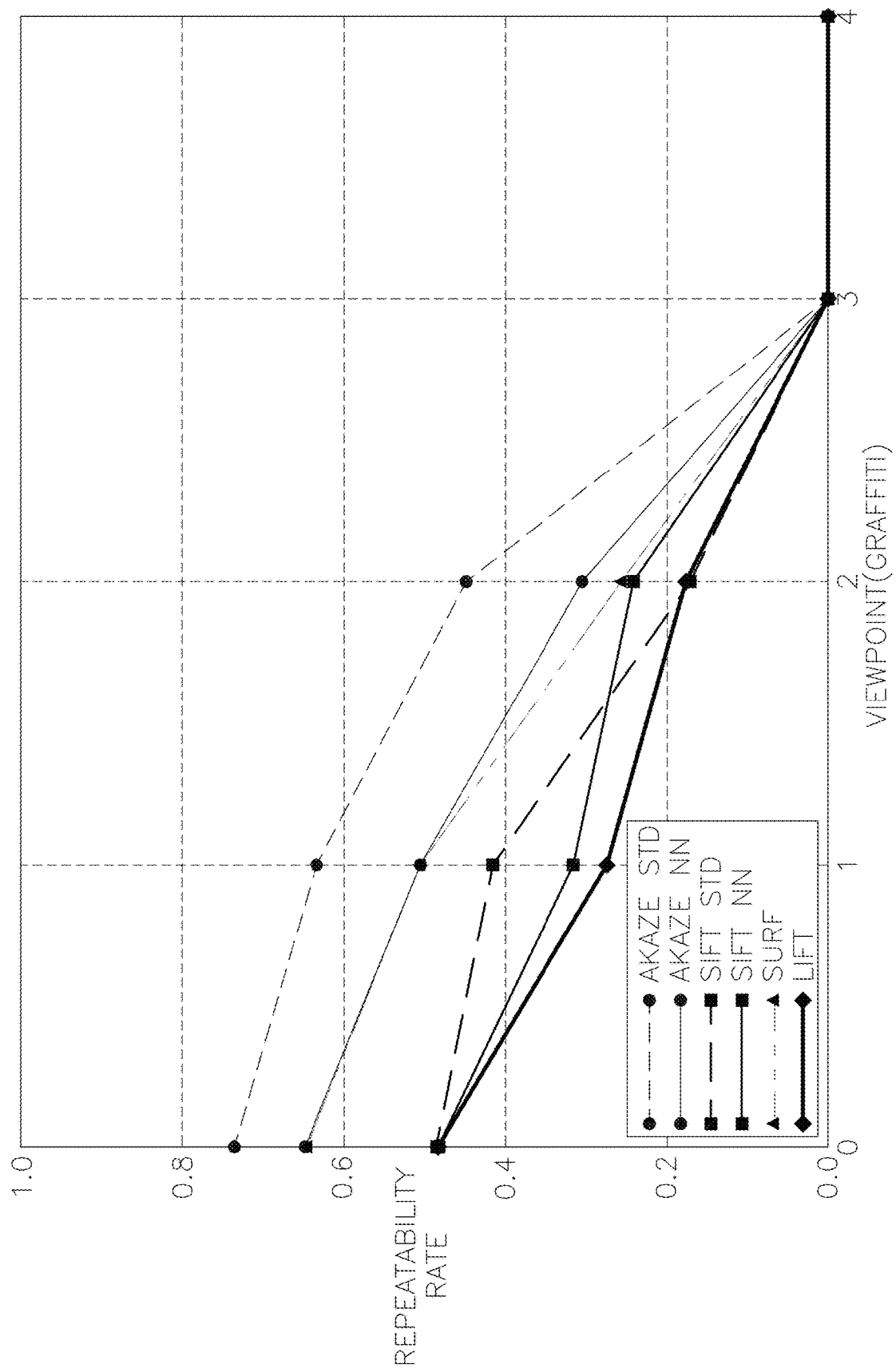

FIG. 11C depicts the repeatability rate of the keypoint detectors with increasing viewpoint angle (e.g., increasing angle between two images used for evaluating the repeatability rate). As shown in FIG. 11C, all keypoint detectors deteriorate in performance with increasing viewpoint angle, with CNN AKAZE keypoint detector generally tracking the performance of the comparative standard AKAZE keypoint detector.

Robustness against blur and robustness against changes in viewpoint angle are useful traits in circumstances where the objects and/or the cameras may be moving, thereby resulting in motion blur (such as when imaging objects moving along a conveyor belt, as discussed in more detail below).

Figure 11D:
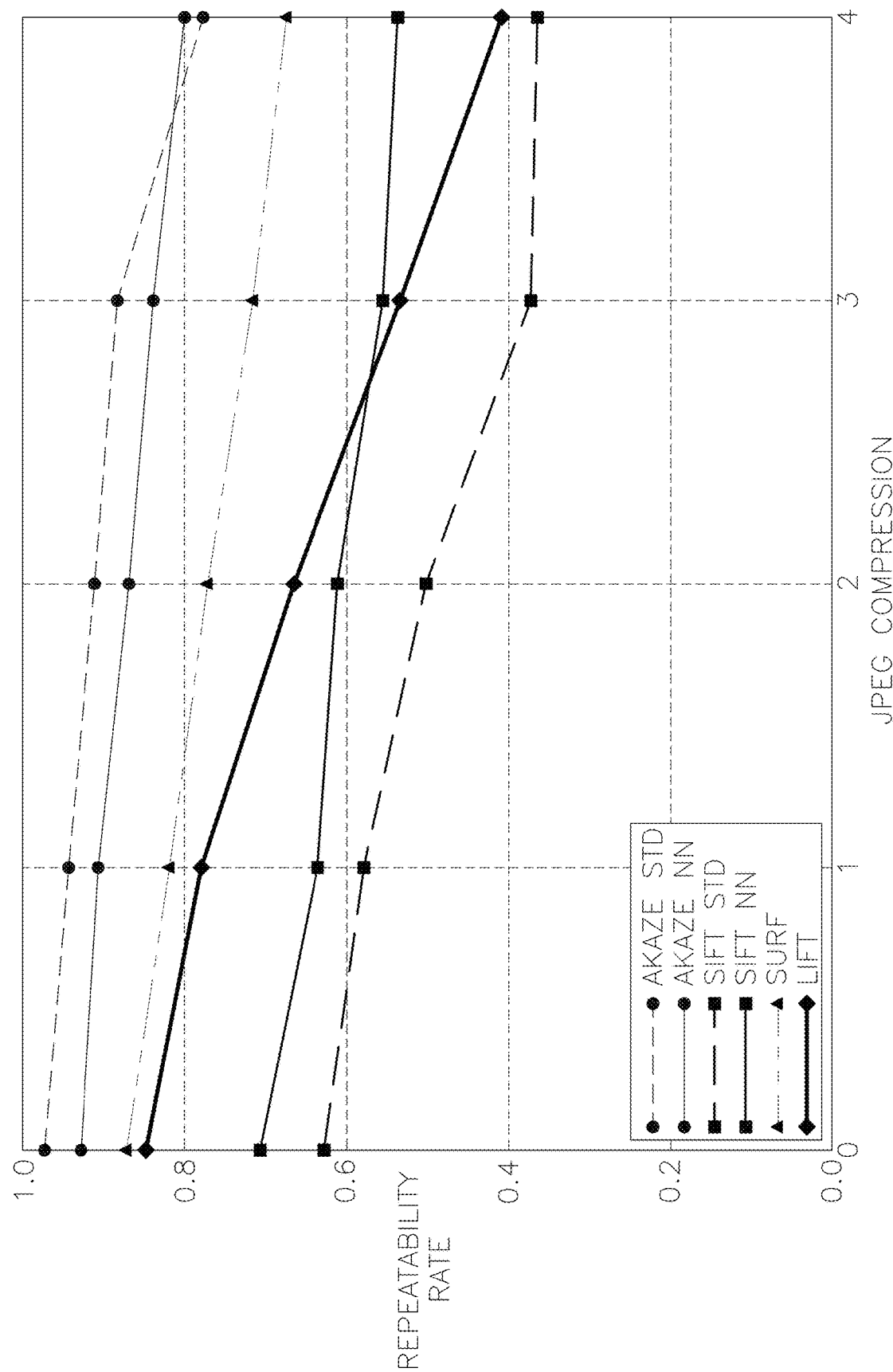

FIG. 11D depicts the repeatability rate of the keypoint detectors in the face of increasing levels of Joint Photographic Experts Group (JPEG) compression. This may be relevant to circumstances where the input images are taken from video data, which is often compressed in a similar fashion.

As seen from FIGS. 11A, 11B, 11C, and 11D, the trained CNN detector "AKAZE NN" successfully approximates the current state-of-the-art "AKAZE std" keypoint detector, thereby validating the approach taken in accordance with embodiments of the present invention.

When trained with SIFT, a CNN keypoint detector performs better than the original SIFT keypoint detector. It is believed that this is because the response $\hat{r}$ generated from the SIFT CNN keypoints is more selective and filtered compared to the original, simpler difference of Gaussians response function of conventional SIFT (because aspects of embodiments of the present invention emulate the smooth response generated from the set of true keypoints instead of a heuristically-chosen image filtering operation).

Therefore, experimental results using standard metrics show that a convolutional network architecture trained in accordance with embodiments of the present invention is able to effectively learn to produce the keypoint responses of the state of the art algorithm, namely KAZE and SIFT in these experiments, and outperforms other learning-based approaches, such as the approaches described in: E. Rosten and T. Drummond. Machine learning for high-speed corner detection. In *Proceedings of the 9th European Conference on Computer Vision—Volume Part I*, ECCV '06, pages 430-443, Berlin, Heidelberg, 2006. Springer-Verlag; E. Rublee, V. Rabaud, K. Konolige, and G. Bradski. Orb: An efficient alternative to SIFT or SURF. In *Proceedings of the 2011 International Conference on Computer Vision*, ICCV '11, pages 2564-2571, Washington, D.C., USA, 2011. IEEE Computer Society; and K. M. Yi, E. Trulls, V. Lepetit, and P. Fua. LIFT: Learned Invariant Feature Transform. In *Proceedings of the European Conference on Computer Vision*, 2016.

Hardware Implementation

As noted above, aspects of embodiments of the present invention relate to the implementation of a convolutional neural network to implement keypoint detection on hardware that is well-adapted for running CNNs. However, embodiments of the present invention are not limited thereto, and may also be implemented on standard computer processors.

As one example, a convolutional neural network as described above may be implemented with values N=16 (e.g., a second layer having sixteen 1×1 convolutional filters), M=16 and w=15 (e.g., a first layer having sixteen 15×15 convolutional filters, generated by separable 1-D filters having length 15). While embodiments of the present invention are not limited to the above values, this particular set of values allows the CNN to be compact enough to be implemented in a low-cost System on Chip (SoC) field programmable gate array (FPGA) such as the Xilinx® Zynq® 7020.

The embodiment implemented on an FPGA runs at an interface clock of 85 MHz and is capable of computing one response value per clock cycle with an overall power consumption of 3.7 Watts. In terms of processing time, generating a response map at a resolution of 1280×800 from a single image of the same resolution takes 12 ms on this FPGA. In order to compute the response function in a complete scale space of four octaves and four sublevel, the total processing time is 64 ms.

In contrast, running KAZE keypoint detection on an image of size 1280×800 pixels takes 58 ms on an Intel® i7-5930K processor dissipating 140 Watts of power. As another example, running the standard AKAZE keypoint detector algorithm on an Intel® i7-4720HQ Processor, which has a thermal design power (TDP) of 47 Watts, the average running time for computing a scale space of the same dimension is 203 ms.

Accordingly, implementation of a CNN keypoint detector in accordance with embodiments of the present invention in an FPGA is capable of generating substantially similar results as the comparable standard implementation of a keypoint detector running on an Intel® i7 processor, while also being an order of magnitude more energy efficient and delivering results more than three times faster.

Aspects of embodiments of the present invention using a dedicated CNN hardware implementation for performing keypoint detection can provide further power savings. For example, some embodiments of the present invention relate to an application specific integrated circuit (ASIC) that is configured to implement a neural network according to embodiments of the present invention. Examples of such ASICs include neuromorphic hardware, as implemented using memristors, threshold switches, and transistors.

Furthermore, in some circumstances, such as where energy usage concerns are less important, it may be beneficial to implement a convolutional neural network in accordance with embodiments of the present invention in a general purpose computer processor and memory.

In various hardware implementations of embodiments of the present invention, such as in an FPGA, in a processor and memory, or an ASIC, the learned parameters (e.g., the weights of the connections between the neurons of the neural network) may be stored in memory, thereby allowing the CNN to be reconfigured to implement different keypoint detectors by writing parameters corresponding to the different keypoint detectors to the memory. This allows a CNN keypoint detector according to embodiments of the present invention to be dynamically reconfigured (e.g., in the field) to detect keypoints in different scenarios, e.g., different types of objects or scenes.

For example, a CNN keypoint detector in accordance with embodiments of the present invention may be deployed in a computer vision system scanning objects on a conveyor belt on a factory floor. The CNN keypoint detector of this computer vision system may be is configured with parameters to implement a keypoint detector that is suited to the particular shapes and characteristics of the products that move along the conveyor belt. In circumstances where the factory is reconfigured to manufacture different products having different shapes and visual characteristics, the CNN keypoint detector can be reprogrammed or reconfigured with another set of weights to implement a different keypoint detector that is better suited to the particular system.

A computational pipeline for performing a computer vision task includes keypoint detection, such as in the flowchart of FIG. 2. According to various embodiments of the present invention, various portions of the computational pipeline can be performed locally (e.g., in hardware directly connected to the cameras 302 capturing images of the scenes to be analyzed) or remotely (e.g., in hardware connected to the cameras over a network, such as on a computer server). Systems and methods for processing the various stages of the computational pipeline locally or remotely are described in more detail in U.S. patent application Ser. No. 15/805,107 "System and Method for Portable Active 3D Scanning," filed in the United States Patent and Trademark Office on Nov. 6, 2017, the entire disclosure of which is incorporated by reference herein.

Example Applications of Convolutional Neural Network Keypoint Detectors

Referring back to FIG. 3, in different embodiments of the present invention, the camera 302 may be a variety of different types of cameras including: a monochrome visible-light camera; a color (e.g., red, blue, and green or "RGB") camera; an infrared (Ir) camera; an RGB-Ir camera (where color pixels are intermingled with infrared pixels on the same sensor), and the like.

In still other embodiments, the camera 302 may be a camera system including a combination of multiple cameras, such as in the case of a stereoscopic camera. In a stereoscopic camera, at least two cameras are arranged to have their optical axes extend in substantially the same direction, but spaced apart along a plane or a baseline. The at least two cameras have overlapping fields of view. One example of such a stereoscopic camera is an RGB-D (color and depth) camera, which may include a first infrared camera, a second infrared camera, and a third color camera, and such cameras are described in more detail in U.S. Pat. No. 9,674,504, "Depth Perceptive Trinocular Camera System," issued on Jun. 6, 2017, the entire disclosure of which is incorporated by reference herein.

Like any regular camera, an RGB-D camera records color images of the scene. In addition, an RGB-D camera it computes and records the distance of the closest surface element along the line of sight through each pixel. Proper calibration of the RGB-D camera allows the assignment of a three-dimensional coordinate (X, Y, Z) to each pixel (for example, by identifying matching features in the images along epipolar lines and computing a disparity map), precisely characterizing the location in 3-D of the surface element seen by each pixel. An RGB-D camera thus generates a "cloud" of 3-D points, where each point has a least three color channel values associated with it. (While some applications of embodiments of the present invention are described herein in the context of RGB-D cameras, embodiments of the present invention are not limited thereto, at least because CNN keypoint detectors according to embodiments of the present invention also operate successfully on standard images, such as 2-D images, and thus are also useful in applications that do not use a range camera such as an RGB-D camera.)

The camera may also be coupled with an illuminator or projection source, such as an infrared light or visible light projector configured to illuminate at least a portion of the scene within the field of view of the cameras of the system. The illuminator may be configured to project a pattern or texture onto the scene, thereby providing additional color information for the CNN keypoint detector in accordance with embodiments of the present invention to detect in the scene (e.g., to provide texture to smooth or featureless surfaces in the scene, thereby increasing the number of potential keypoints in the scene).

Structure from Motion

Structure-from-motion (SfM) is a general technique for camera motion recovery and scene geometry description from a sequence of images. It assumes that the scene being viewed (or at least a part of it) is stationary, and that the images contain some "visual texture" (e.g., it cannot be used in front of a smooth, featureless wall without a pattern projector, as described above).

Figure 12:
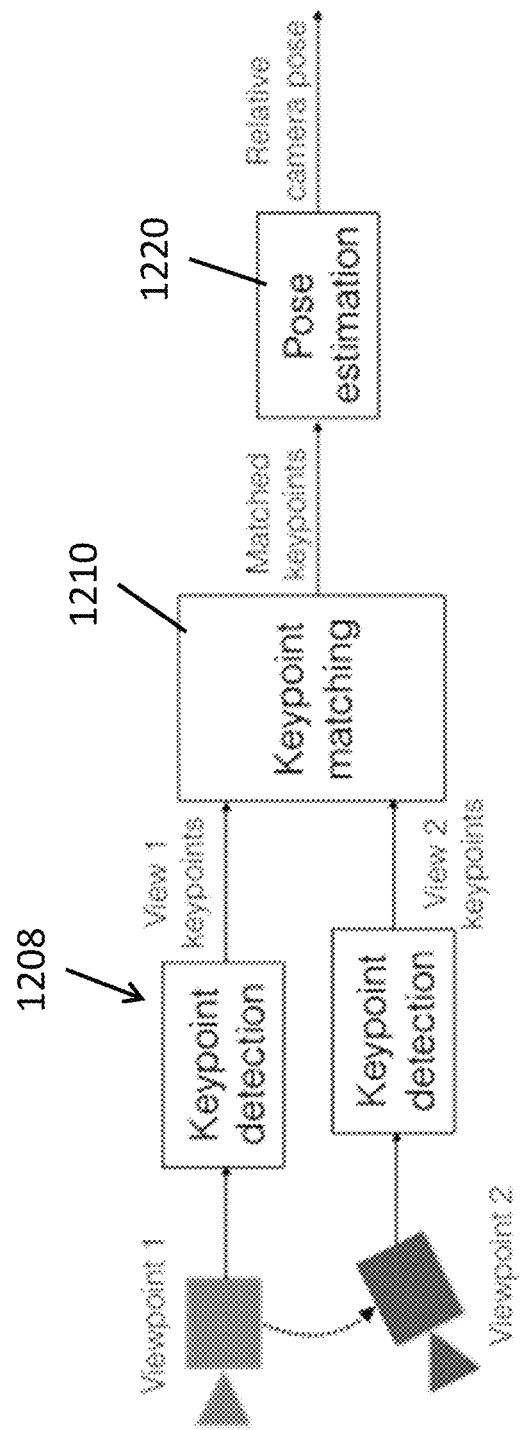
FIG. 12 is a schematic block diagram of a system for relative camera pose estimation from two views of the same scene according to one embodiment of the present invention.

FIG. 12 is a schematic block diagram of a system for relative camera pose estimation from two views of the same scene according to one embodiment of the present invention. Computing structure-from-motion includes (1) detection 1208 of a number of keypoints from each image; and (2) matching of keypoints 1210 between two (or more) consecutive images in time and/or position. Once a large enough number of keypoint matches has been computed, the relative camera pose 1220 between the two viewpoints can be obtained using standard algebraic operations.

In practice, computing an exact match between two sets of keypoints, one per image, is difficult and error-prone. For this reason, it is customary to resort to an iterative robust algorithm such as RANSAC (see, e.g., Fischler, M. A., & Bolles, R. C. (1981). Random sample consensus: a paradigm for model fitting with applications to image analysis and automated cartography. Communications of the ACM, 24(6), 381-395.). RANSAC selects a subset of matches that can be expected to be accurate by randomly selecting a small subset of matches, using these matches to estimate the epipolar geometry of the two cameras (which is a minimal representation of the cameras' joint geometry), then validating the epipolar geometry thus computed against all matches by finding all matches ("inners") that are consistent with it within a certain threshold accuracy level. This operation is repeated a large number of times, and the largest set of inliers obtained in this way is used to compute the relative camera pose.

One by-product of computing SfM is the estimate of a "sparse" description of the scene three-dimensional geometry (in correspondence to tracked features). This estimate could be used also to initialize or complement other three-dimensional geometry estimation techniques, such as in dense stereoscopy.

In terms of computational cost, the processing time for an implementation of SfM is dominated by keypoint detection 1208. For example, using the Intel® i7-5930K processor discussed above, the time required for SfM processing the keypoint matching 1210 and pose estimation 1220 portions of SfM is approximately 5 ms, which is ten times less than the cost of computing the KAZE keypoints in the image (which takes 58 ms on the same processor using a comparative keypoint detector, as discussed above).

Therefore, in some embodiments, implementing SfM using a hardware CNN keypoint detector can reduce the processing time from about 60 ms to about 20 ms, thereby significantly increasing the potential throughput of a computer vision system configured to perform SfM computations.

Stitching Point Clouds

A "point cloud" is a collection of three-dimensional data points. For example, a range camera (or depth camera) such as a stereoscopic camera (e.g., the RGB-D camera), or a time-of-flight (ToF) depth camera can generate a point cloud of a scene by capturing the distances between the range camera to the visible portions of the scene, and the resulting distances can be transformed to various coordinate systems.

Merging (or "stitching") two point clouds (generated, for example, by a range or an RGB-D camera) is normally achieved using the Iterative Closest Point (ICP) algorithm (see, e.g., Besl, P. J., & McKay, N. D. (1992, April). Method for registration of 3-D shapes. In Robotics-DL tentative (pp. 586-606). International Society for Optics and Photonics.) or a variant thereof. ICP operates based on the assumption that, if an association can be drawn between points in the two point clouds (meaning that it is possible to infer whether two points, one per cloud, correspond to the same surface element), then it is possible to compute the relative pose (translation and relative orientation) of the object between the two views (or, equivalently, the relative pose of a moving camera looking at a static object).

Generally, ICP establishes a correspondence between the points in the two clouds in an iterative fashion, by first assigning to each point in one cloud the closest point in the other cloud. The relative object pose is then computed, and the point cloud in the first view is synthetically transformed according to the resulting translation and rotation (e.g., rigid transformation). The process is then repeated with the transformed first point cloud matched against the second point cloud, until point association does not change (or change minimally) across iterations, or until the sum of distances of associated points is smaller than a given threshold. In most cases, after a large enough number of iterations, the algorithm converges to the correct relative pose, enabling merging of the second point cloud with the correctly transformed first one.

However, surface patches of the point clouds that are planar or rotationally symmetric may impede the process of identifying correspondences, thereby frustrating or, in some cases, making it impossible to find the correct relative pose of the object from the point clouds, and thereby causing errors or failures in the merging of the point clouds.

Figure 13:
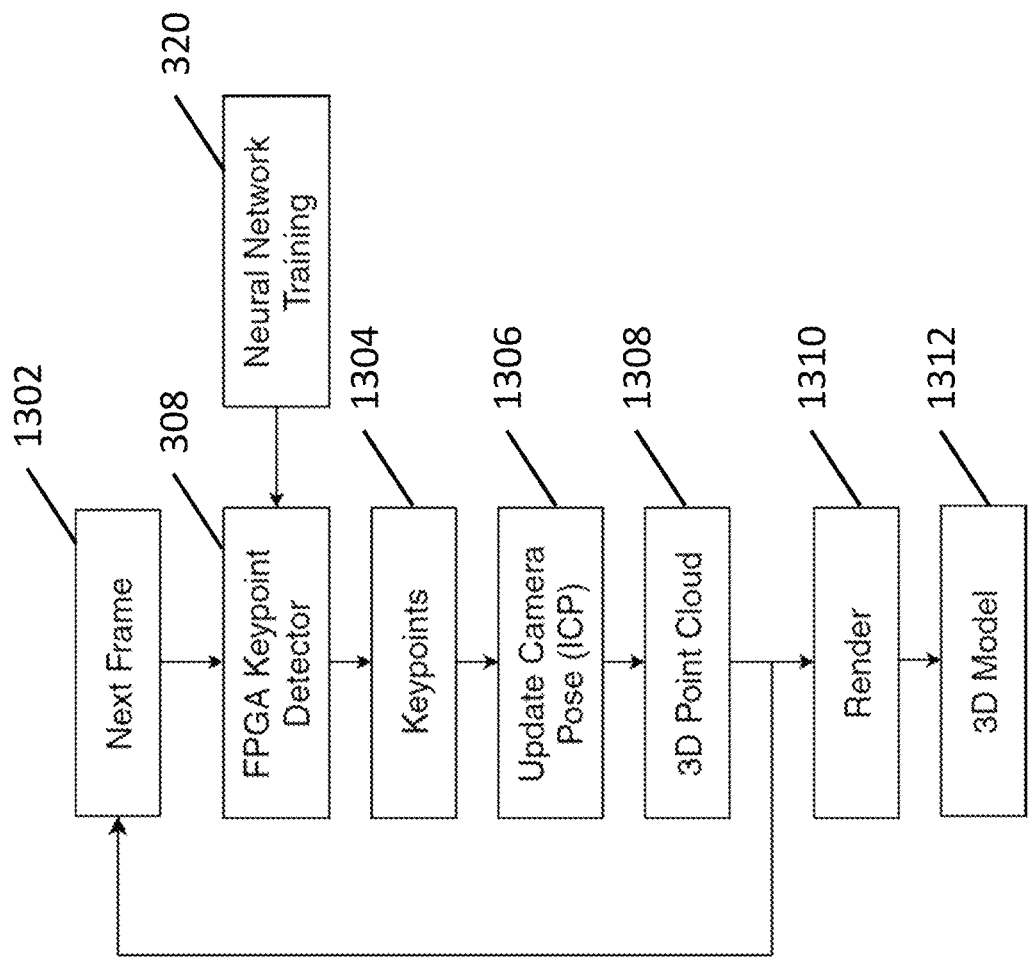
FIG. 13 is a flowchart of a method for generating a three-dimensional (3-D) model of an object by aligning captured point clouds according to one embodiment of the present invention.

Some embodiments of the present invention are directed to using a CNN keypoint detector in accordance with embodiments of the present invention to accelerate the process of merging point clouds. FIG. 13 is a flowchart of a method for generating a three-dimensional (3-D) model of an object by aligning captured point clouds according to one embodiment of the present invention. Referring to FIG. 13, in operation 1302, a next frame (e.g., 3-D point cloud) of a scene is captured by a range camera and supplied to the CNN keypoint detector 308 (which may be configured with learned parameters computed by the training system 320). The CNN keypoint detector 308 computes keypoints 1304, and the keypoints ae supplied to a computer vision system (e.g., a computer system including a processor and memory) configured to perform the ICP computer vision task 1306. In particular, the computer vision system may be used to attempt to establish correspondences between the keypoints detected in the image with keypoints detected in previous image frames, and the point clouds can be merged by performing a rigid transformation on at least one of the point clouds to align the identified corresponding keypoints. The result of the ICP is the stitched 3-D point cloud 1308 (e.g., the combination of the newly captured frame with one or more previously captured frames). If scanning is to continue, another frame is captured by the range camera in operation 1302. If scanning is complete, then the merged point clouds can be rendered 1310 to generate a 3-D model 1312, which can be displayed (e.g., on a display device).

Using a hardware CNN according to embodiments of the present invention to perform keypoint detection, as described above, allows the stitching of point clouds to be performed locally (e.g., on a local user device) and with low latency. This improves the user experience, because the user can receive rapid feedback about the objects or scenes being scanned. For example, embodiments of the present invention allow these operations to be performed on a battery powered handheld device, and can provide information about the scanned object in near real-time.

Figure 14:
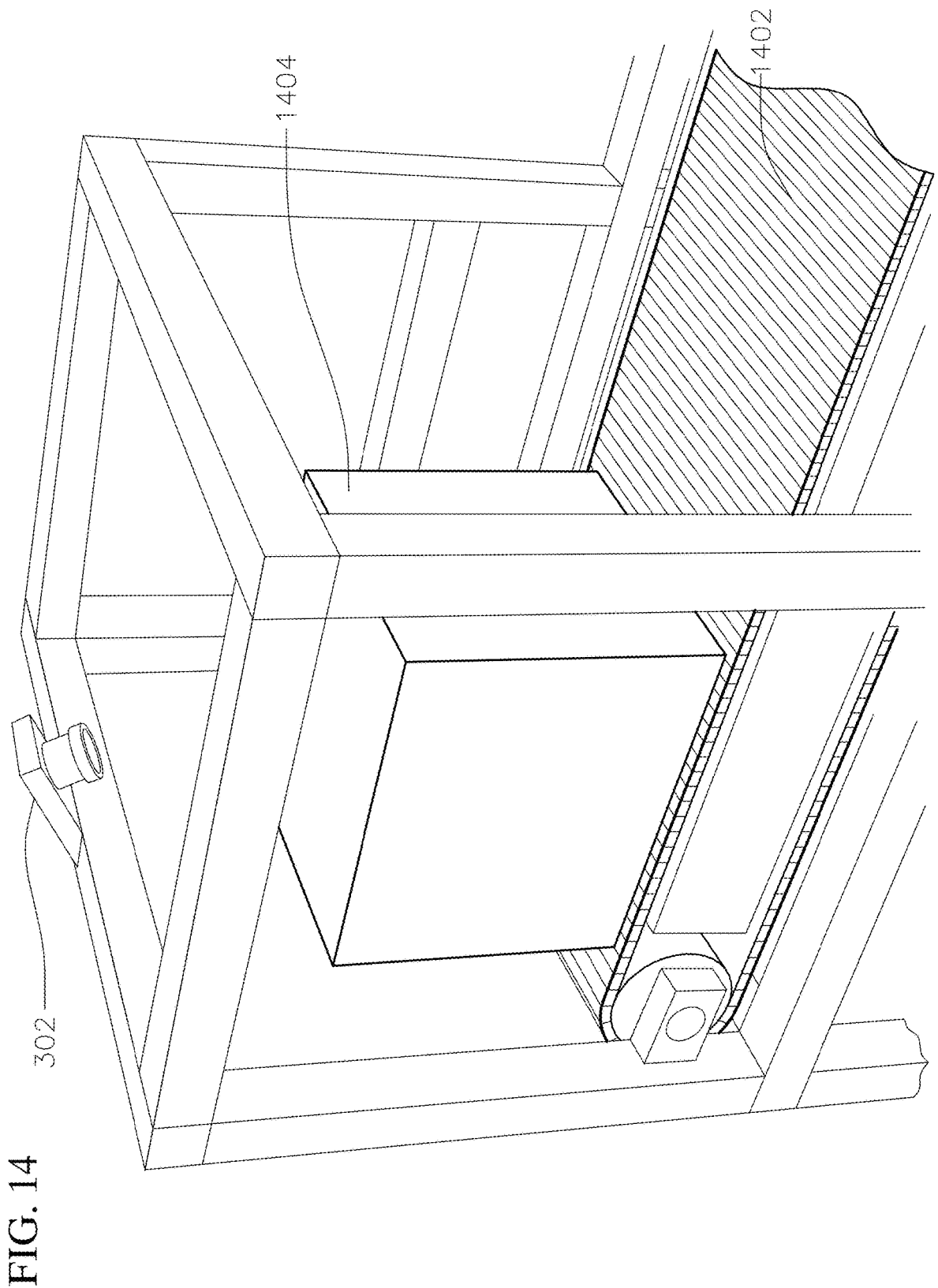
FIG. 14 is a photograph of a scanning system configured to capture a 3-D model of an object according to one embodiment of the present invention.

One specific example of an application of embodiments of the present invention is the computation of the dimensions of boxes, such as boxes moving on a conveyor belt. FIG. 14 is a photograph of a scanning system configured to capture a 3-D model of an object according to one embodiment of the present invention. As shown in FIG. 14, a box scanning system according to one embodiment of the present invention includes an RGB-D camera 302 mounted to capture images of a conveyor belt 1402 and objects 1404 (e.g., boxes) moving on the conveyor belt.

If an entire box can be seen by the camera 302, then the dimensions of the box can be computed, for example, by finding the best rectangular parallelepiped (e.g., rectangular prism) fit to the captured point cloud, with the constraint that one face of the parallelepiped lays on the belt.

However, in practice it may be the case that a full view of the object does not appear in a single frame. This could be the case, for example, when the object is too large to fit within the field of view of the RGB-D camera (e.g., because the RGB-D camera is too close to the object, as in the case shown in FIG. 3). As another example, if the image acquisition is not synchronized with the boxes traveling on the conveyor belt, or if the box is too large, then different parts of the box may be captured in different frames.

Accordingly, in order to compute the dimensions of the entire box, some embodiments of the present invention first merge the multiple captured point clouds obtained of the box before performing the measurements ("metrology"). In some circumstances, where the velocity of the conveyor belt is known, it may be possible to merge the point clouds by translating the point clouds in accordance with the time between the captures and the velocity of the conveyor belt. However, in many circumstances, the velocity of the conveyor belt varies over time, or may not be known with sufficient precision.

Accordingly, some embodiments of the present invention relate to tracking keypoints of the box across consecutive images, where the keypoints are generated based on the appearance of features on the surface of the box, thereby allowing for point cloud merging, as described above with respect to FIG. 13.

Another example of embodiments of the present invention relates to computing the sizes of boxes using a hand-held scanner. This application refers to the task of measuring the size and location of boxes leaning on the ground, inside a truck, or resting on a shelf, using a handheld scanning system, which may include an RGB-D camera. This is a frequent task for logistics applications, such as box counting and free volume estimation for "dimensional weight" estimation to determine a shipping price. In many situations, it is convenient to use a hand-held RGB-D camera to acquire multiple images of the boxes that are to be sized. By capturing a sufficiently large number of scans of the scene, and by merging the resulting point clouds, the hand-held scanner obtains a 3-D representation (in the form of a single point cloud or of a voxel-based volumetric representation) of the scene of interest, and automatically computes the volumes of the boxes in the scene.

As in the case of described above of boxes traveling on a conveyor belt, stitching together point clouds containing partial views of a box may be challenging using Iterative Closest Point (ICP). Accordingly, the ability to detect and track keypoints in the images helps improves the likelihood of ICP being able to identify correct associations between 3-D points in different point clouds, thus enabling point cloud stitching and overall 3-D reconstruction. A CNN keypoint detector, implemented in an FPGA, in accordance with embodiments of the present invention is characterized by very low power consumption, and is thus well suited for use in an untethered, battery-powered hand-held RGB-D scanner.

Another application of embodiments of the present invention relates to the task of automatically inspecting a product (e.g., a shoe, a bottle, or an assembled piece of consumer electronics, and the like) using a hand-held 3D scanner using a RGB-D sensor. In this case, multiple views of the object are obtained while the scanner is moved around the object to capture views of the different sides of the object. In order to analyze the captured 3-D model of the object to detect defects (see, e.g., U.S. patent application Ser. No. 15/866, 217, "Systems and Methods for Defect Detection," filed in the United States Patent and Trademark Office on Jan. 9, 2018, the entire disclosure of which is incorporated by reference herein), the captured 3-D model should be substantially free of artifacts caused by the scanning process (e.g., a self-consistent and accurate representation of the surface boundary of the object). Any detected defects can then be displayed on a display device of the hand-held 3D scanner (e.g., overlaid on a display of the captured 3-D model). Accordingly, a CNN keypoint detector in accordance with embodiments of the present invention can be used to reduce the latency of generating point clouds, thereby improving the quality of user feedback during the scanning process.

Another example of an application of embodiments of the present invention relates to markerless head tracking. Head-mounted display devices are typically featured in virtual reality (VR) and augmented reality (AR) goggles. These systems synthesize a virtual image of the scene (VR) or of specific objects (AR) to create a realistic experience for the user. In both VR and AR, the scene or objects of interest are represented geometrically in terms of a fixed 3-D reference system. Then, given the pose (orientation and location in 3-D space) of the user's head, defined with respect to the same reference coordinate system, an image is generated that accurately mimics view of the scene or of the objects of interest as if seen from that pose.

While image synthesis for a specific head pose can be performed in very little time due to high speed graphics processing units (GPUs), accurate and fast head pose estimation is an obstacle to realistic rendering. For example, poor synchronization or latency between the movement of the user's head and the rendered scene (as due to inaccurate head pose tracking, latency between motion and rendering, or rendering at low frame rate) is a main cause of motion sickness by VR users. (Indeed, it has been estimated that latency should be kept to less than 20 ms to avoid motion sickness. See, e.g., LaValle, S. M., Yershova, A., Katsev, M., & Antonov, M. (2014, May). Head tracking for the Oculus Rift. In Robotics and Automation (ICRA), 2014 IEEE International Conference on (pp. 187-194). IEEE.) In the case of AR systems, virtual objects are placed with reference to specific 3-D structures in the "real" world (e.g., a figurine walking on a table top). If the user's head pose is not tracked accurately, the virtual object may become noticeably disconnected from the real world structure, greatly diminishing the desired "immersive" effect.

In some comparative systems, head orientation is computed using inertial sensors (accelerometers and gyros). However, the resulting accuracy would be low, on the order of 1° or more. As a specific example of the magnitude of a 1° error, consider an AR system generating the image of a virtual object lying on a table top at the distance of 1 meter from the user. An error of 1° in the estimation of the head's roll angle would result in the displacement of the object by 1.75 cm above or below the table top surface, which would be visually noticeable. In addition, inertial sensors are ill-suited to track the head position. Even using sophisticated kinematic modeling of the user's head, and assuming that the user sat relatively still in a chair, drift affects location estimation, resulting in an accumulated error of more than one meter after less than 30 seconds of double integration from the accelerometer (see, e.g., You, S., & Neumann, U. (2001, March). Fusion of vision and gyro tracking for robust augmented reality registration. In Virtual Reality, 2001. Proceedings. IEEE (pp. 71-78). IEEE.).

In contrast, head tracking using visual information from cameras has been shown to provide better accuracy and little or no drift (see, You et al., above). Such visual head tracking systems include two approaches: outside-in and inside-out. Outside-in systems use one or more fixed cameras aimed at the user's goggles, which can be marked using a distinctive fiducial. This motion capture strategy can be accurate and fast, provided that the user remains within the visual field of the cameras. However, the need for calibrated external devices makes it unpractical and substantially diminishes its attractiveness.

Inside-out systems, on the other hand, use a camera mounted on the goggles themselves. In early prototypes of AR/VR systems, printed patterns containing special markers were used placed at locations visible by the camera. These patterns were designed in such a way that, from a single image of the pattern, it would be possible to compute the camera pose with respect to a reference system rigidly attached to the pattern. Although this technique is fast and effective, the requirement that a special pattern be visible in the scene reduces its usefulness in realistic scenarios.

On the other hand, aspects of embodiments of the present invention allow for rapid and low power image-based head pose tracking without any environment modifications using structure-from-motion (SfM), discussed above, to process images of the external environment, as acquired by the camera, assuming that the scene being viewed (or at least a large part of it) is stationary.

To summarize, aspects of embodiments the present invention relate to; the design of a compact, three-layer CNN architecture; the use of separable convolutional filters with quantized weights in the CNN; training a CNN to learn the response function of the state-of-the-art, manually derived keypoint detectors; and the introduction of a training methodology that enables efficient exploitation of available training data, including training data generated from other manually derived keypoint detectors, thereby allowing embodiments of the present invention to make use of advances in the theory and development of keypoint detectors.

Implementing a keypoint detector as a CNN in hardware allows for high speed, low power detection of keypoints in images. Keypoint detection is generally a major bottleneck in a computer vision pipeline, and can be an impediment to low latency, near real-time applications of computer vision. However, because embodiments of the present invention enable very rapid keypoint detection, a wide range of additional applications of computer vision technology is now possible, such as through low latency head tracking and rapid point cloud merging for 3-D scanning applications.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system comprising:
a camera system comprising at least one camera; and
a processor and memory, the processor and memory being configured to:
receive an image captured by the camera system;
compute a plurality of keypoints in the image, using a convolutional neural network comprising:
a first layer implementing a first convolutional kernel,
a second layer implementing a second convolutional kernel,
an output layer, and
a plurality of connections between the first layer and the second layer and between the second layer and the output layer, each of the connections having a corresponding weight stored in the memory, wherein the weights are computed by a training system comprising a processor and memory, the memory of the training system having instructions stored thereon that, when executed by the processor of the training system, cause the training system to:
generate training data comprising a plurality of training images and training detected keypoints of the training images,
transform the training detected keypoints to a response space,
uniformly sample patches from the response space,
identify patches of the training images corresponding to the sampled patches to generate a first training set for training the convolutional neural network, and
compute a plurality of first stage learned neural network parameters from the first training set using backpropagation, and
further train the convolutional neural network using additional patches from the response space and patches of the training images corresponding to the sampled response space patches; and
output the plurality of keypoints of the image computed by the convolutional neural network.

2. The system of claim 1, wherein the training detected keypoints comprise manually generated training detected keypoints.

3. The system of claim 1, wherein the training detected keypoints comprise keypoints generated by supplying the training images to one or more keypoint detection algorithms.

4. The system of claim 3, wherein the one or more keypoint detection algorithms comprise KAZE.

5. The system of claim 3, wherein the one or more keypoint detection algorithms comprise SIFT.

6. The system of claim 3, wherein the training data is computed using at least two different keypoint detection algorithms.

7. The system of claim 3, wherein the training detected keypoints further comprise manually generated training detected keypoints.

8. The system of claim 1, wherein the memory of the training system further has instructions stored thereon that, when executed by the processor of the training system, cause the training system to train the convolutional neural network further by:
configuring the convolutional neural network using the first stage learned neural network parameters;
computing inferred responses of the convolutional neural network, configured with the first stage learned neural network parameters, to a plurality of training images;
adding, to the first training set, patches from the training images where a difference between the inferred response and the response space exceeds a threshold to generate a second training set;
adding, to the second training set, additional patches randomly sampled from the training images; and computing a plurality of second stage learned neural network parameters from the second training set using backpropagation.

9. The system of claim 8, wherein the memory of the training system further has instructions stored thereon that, when executed by the processor of the training system, cause the training system to train the convolutional neural network further by repeatedly updating the second stage learned neural network parameters until a convergence state of the second stage learned neural network parameters, the updating the second stage learned neural network parameters comprising:
    configuring the convolutional neural network using the second stage learned neural network parameters;
    computing updated inferred responses of the convolutional neural network, configured with the second stage learned neural network parameters, to the plurality of training images;
    adding, to the second training set, patches from the training images where a difference between the updated inferred response and the response space exceeds the threshold;
    adding, to the second training set, additional patches randomly sampled from the training images; and
    re-computing the plurality of second stage learned neural network parameters from the second training set using backpropagation.

10. The system of claim 1, wherein the first convolutional kernel is separable.

11. The system of claim 1, wherein the camera system comprises:
    a first infrared camera having a first optical axis and a field of view;
    a second infrared camera having a second optical axis substantially parallel to the first optical axis and a field of view substantially overlapping the field of view of the first infrared camera; and
    an infrared illuminator configured to project light in a direction within the field of view of the first infrared camera and the field of view of the second infrared camera,
    wherein the image is a point cloud computed from infrared images captured by the first infrared camera and the second infrared camera.

12. The system of claim 1, wherein the processor comprises a field programmable gate array, and wherein the field programmable gate array is configured by the weights to implement the convolutional neural network.

13. The system of claim 1, wherein the weights have values quantized as fixed points.

14. A system comprising:
    a camera system comprising at least one camera; and
    a processor and memory, the processor and memory being configured to:
        receive an image captured by the camera system;
        compute a plurality of keypoints in the image using a convolutional neural network comprising:
            a first layer implementing a first convolutional kernel;
            a second layer implementing a second convolutional kernel;
            an output layer; and
            a plurality of connections between the first layer and the second layer and between the second layer and the output layer, each of the connections having a corresponding weight stored in the memory; and
        output the plurality of keypoints of the image computed by the convolutional neural network,
    wherein the camera system comprises:
        a first infrared camera having a first optical axis and a field of view;
        a second infrared camera having a second optical axis substantially parallel to the first optical axis and a field of view substantially overlapping the field of view of the first infrared camera; and
        an infrared illuminator configured to project light in a direction within the field of view of the first infrared camera and the field of view of the second infrared camera,
    wherein the image is a point cloud computed from infrared images captured by the first infrared camera and the second infrared camera,
    wherein the camera system is arranged to place a conveyor belt in the field of view of the first infrared camera and the field of view of the second infrared camera, and
    wherein the processor is configured to:
        control the camera system to capture images of objects on the conveyor belt;
        compute a plurality of point clouds from the images of the objects;
        identify keypoints of the point clouds using the convolutional neural network; and
        merge two or more of the point clouds by identifying corresponding ones of the keypoints and rigidly transforming at least one of the point clouds to align the corresponding ones of the keypoints.

15. The system of claim 14, wherein the processor is further configured to compute a volume of an object in accordance with one or more captured point clouds of the object.

16. A method for computing keypoints of an image, comprising:
    controlling, by a processor, a camera system comprising at least one camera to capture an image, wherein the image is a point cloud computed infrared images captured by a camera system comprising:
        a first infrared camera having a first optical axis and a field of view,
        a second infrared camera having a second optical axis and field of view, the first optical axis being substantially parallel to the second optical axis, and the field of view of the first infrared camera substantially overlapping the field of view of the second infrared camera, and
        an infrared illuminator configured to project light in a direction within the field of view of the first camera and the field of view of second infrared camera;
    controlling the camera system to capture images of objects on a conveyor belt;
    computing a plurality of point clouds from the images of the objects;
    identifying keypoints of the point clouds using a convolutional neural network;
    merging two or more of the point clouds by identifying corresponding ones of the keypoints;
    supplying, by the processor, the image to the convolutional neural network to compute a plurality of keypoints,
    the convolutional neural network comprising:
        a first layer implementing a first convolutional kernel;

a second layer implementing a second convolutional kernel;
an output layer; and
a plurality of connections between the first layer and the second layer and between the second layer and the output layer, each of the connections having a corresponding weight stored in a memory; and
outputting the plurality of keypoints of the image computed by the convolutional neural network.

17. The method of claim 16, wherein the weights are computed by: generating training data comprising a plurality of training images and training detected keypoints of the training images; and training the convolutional neural network using the training images and the training detected keypoints of the training data.

18. The method of claim 17, wherein the training detected keypoints comprise manually generated training detected keypoints.

19. The method of claim 17, wherein the training detected keypoints comprise keypoints generated by supplying the training images to one or more keypoint detection algorithms.

20. The method of claim 19, wherein the one or more keypoint detection algorithms comprise KAZE.

21. The method of claim 19, wherein the one or more keypoint detection algorithms comprise SIFT.

22. The method of claim 19, wherein the training data is computed using at least two different keypoint detection algorithms.

23. The method of claim 19, wherein the training detected keypoints further comprise manually generated training detected keypoints.

24. The method of claim 17, wherein the training the convolutional neural network comprises:
transforming the training detected keypoints to a response space;
uniformly sampling patches from the response space;
identifying patches of the training images corresponding to the sampled patches to generate a first training set for training the convolutional neural network; and
computing a plurality of first stage learned neural network parameters from the first training set using backpropagation.

25. The method of claim 24, wherein the training the convolutional neural network further comprises:
configuring the convolutional neural network using the first stage learned neural network parameters;
computing inferred responses of the convolutional neural network, configured with the first stage learned neural network parameters, to a plurality of training images;
adding, to the first training set, patches from the training images where a difference between the inferred response and the response space exceeds a threshold to generate a second training set;
adding, to the second training set, additional patches randomly sampled from the training images; and
computing a plurality of second stage learned neural network parameters from the second training set using backpropagation.

26. The method of claim 25, wherein the training the convolutional neural network further comprises repeatedly updating the second stage learned neural network parameters until a convergence state of the second stage learned neural network parameters, the updating the second stage learned neural network parameters comprising:
configuring the convolutional neural network using the second stage learned neural network parameters;
computing updated inferred responses of the convolutional neural network, configured with the second stage learned neural network parameters, to the plurality of training images;
adding, to the second training set, patches from the training images where a difference between the updated inferred response and the response space exceeds the threshold;
adding, to the second training set, additional patches randomly sampled from the training images; and
re-computing the plurality of second stage learned neural network parameters from the second training set using backpropagation.

27. The method of claim 16, wherein the first convolutional kernel is separable.

28. The method of claim 16, further comprising computing a volume of an object in accordance with one or more captured point clouds of the object.

29. The method of claim 16, A wherein the processor comprises a field programmable gate array, and wherein the field programmable gate array is configured by the weights to implement the convolutional neural network.

30. The method of claim 16, wherein the weights have values quantized as fixed points.

* * * * *